(12) United States Patent
Kubo et al.

(10) Patent No.: US 10,809,427 B2
(45) Date of Patent: *Oct. 20, 2020

(54) INFRARED-ABSORBING COMPOSITION, INFRARED-CUT FILTER, AND IMAGING OPTICAL SYSTEM

(71) Applicant: Nippon Sheet Glass Company, Limited, Tokyo (JP)

(72) Inventors: Yuichiro Kubo, Tokyo (JP); Katsuhide Shimmo, Kanagawa (JP)

(73) Assignee: NIPPON SHEET GLASS COMPANY, LIMITED, Tokyo (JP)

( * ) Notice: Subject to any disclaimer, the term of this patent is extended or adjusted under 35 U.S.C. 154(b) by 67 days.

This patent is subject to a terminal disclaimer.

(21) Appl. No.: 15/756,836

(22) PCT Filed: Apr. 19, 2017

(86) PCT No.: PCT/JP2017/015791
§ 371 (c)(1),
(2) Date: Mar. 1, 2018

(87) PCT Pub. No.: WO2017/183671
PCT Pub. Date: Oct. 26, 2017

(65) Prior Publication Data
US 2018/0275326 A1    Sep. 27, 2018

(30) Foreign Application Priority Data
Apr. 21, 2016    (JP) .................................. 2016-085239

(51) Int. Cl.
*G02B 5/20* (2006.01)
*C07F 9/38* (2006.01)
(Continued)

(52) U.S. Cl.
CPC ................ *G02B 5/208* (2013.01); *C07F 9/09* (2013.01); *C07F 9/3808* (2013.01);
(Continued)

(58) Field of Classification Search
CPC .................. C08K 5/521; C08K 5/5317; C08K 2201/005; C08K 2201/014; C07F 9/09;
(Continued)

(56) References Cited

U.S. PATENT DOCUMENTS

| | | | |
|---|---|---|---|
| 7,025,908 | B1 | 4/2006 | Hayashi et al. |
| 2005/0008969 | A1 | 1/2005 | Miyako et al. |

(Continued)

FOREIGN PATENT DOCUMENTS

| | | | |
|---|---|---|---|
| JP | 2001042230 A | 2/2001 | |
| JP | 2001154015 A | 6/2001 | |

(Continued)

OTHER PUBLICATIONS

International Search Report issued for International Patent Application No. PCT/JP2017/015791, dated Jul. 18, 2017, 5 pages including English translation.

*Primary Examiner* — Bijan Ahvazi
(74) *Attorney, Agent, or Firm* — Hamre, Schumann, Mueller & Larson, P.C.

(57) ABSTRACT

An infrared-absorbing composition according to the present invention includes: an infrared absorber formed by a phosphonic acid represented by the following formula (a) and copper ion; and a phosphoric acid ester allowing the infrared absorber to be dispersed. The phosphoric acid ester includes at least one of a phosphoric acid diester and a phosphoric acid monoester. $R_1$ is a phenyl group or a phenyl group in which at least one hydrogen atom is substituted by a halogen atom. When molar contents of the phosphonic acid, the (Continued)

copper ion, and the phosphoric acid ester are respectively defined as $C_A$ mol, $C_C$ mol, and $C_E$ mol and a total molar content of reactive hydroxy groups is defined as $C_H$ mol, the relations $C_A/C_E<1$ and $C_H/C_C>1.95$ are satisfied.

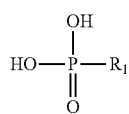

(a)

11 Claims, 12 Drawing Sheets

(51) Int. Cl.
| | |
|---|---|
| *C09D 183/04* | (2006.01) |
| *G02B 5/22* | (2006.01) |
| *C07F 9/09* | (2006.01) |
| *C08G 77/04* | (2006.01) |
| *C08K 5/521* | (2006.01) |
| *C08K 5/5317* | (2006.01) |

(52) U.S. Cl.
CPC ............ *C07F 9/3834* (2013.01); *C08G 77/04* (2013.01); *C08K 5/521* (2013.01); *C08K 5/5317* (2013.01); *C09D 183/04* (2013.01); *G02B 5/22* (2013.01); *C08K 2201/014* (2013.01)

(58) Field of Classification Search
CPC ....... C07F 9/3834; C07G 77/04; G02B 5/208; G03B 5/208; G03B 11/00; C08G 77/04
See application file for complete search history.

(56) References Cited

U.S. PATENT DOCUMENTS

| | | | |
|---|---|---|---|
| 2007/0244221 A1* | 10/2007 | Ueda | C08K 5/0091 523/170 |
| 2013/0094075 A1 | 4/2013 | Saitoh et al. | |
| 2015/0293283 A1 | 10/2015 | Nara et al. | |
| 2015/0301245 A1 | 10/2015 | Kawashima et al. | |

FOREIGN PATENT DOCUMENTS

| | | | | |
|---|---|---|---|---|
| JP | 2002069305 A | * | 3/2002 | ............ C08L 101/00 |
| JP | 2006313974 | | 11/2006 | |
| JP | 2008165215 A | | 7/2008 | |
| JP | 2009242650 A | | 10/2009 | |
| JP | 2011099038 | | 5/2011 | |
| JP | 2011203467 A | | 10/2011 | |
| JP | 2012185385 A | | 9/2012 | |
| JP | 2015043061 | | 3/2015 | |
| JP | 2015043063 A | | 3/2015 | |
| JP | 2015131928 A | * | 7/2015 | ............ B29C 67/00 |
| WO | 2011158635 A1 | | 12/2011 | |
| WO | WO-2013168824 A1 | * | 11/2013 | ................ C08F 2/44 |

* cited by examiner

INFRARED-ABSORBING COMPOSITION, INFRARED-CUT FILTER, AND IMAGING OPTICAL SYSTEM

TECHNICAL FIELD

The present invention relates to an infrared-absorbing composition, an infrared-cut filter, and an imaging optical system.

BACKGROUND ART

In imaging apparatuses such as digital cameras, silicon (Si)-based two-dimensional image sensors such as a charge coupled device (CCD) and a complementary metal oxide semiconductor (CMOS) are used as imaging sensors. Such a Si-based imaging sensor is sensitive to light of wavelengths in the infrared region and has wavelength characteristics incompatible with the visual sensitivity of humans. In imaging apparatuses, therefore, a filter (infrared-cut filter) for shielding against incident light of wavelengths in the infrared region is typically disposed ahead of an imaging sensor so that an image obtained by the imaging sensor comes closer to an image as perceived by humans.

For example, Patent Literature 1 describes a composite filter including an absorptive cut filter (light-absorbing element) and a reflective cut coating (interference film) provided on the surface of the absorptive cut filter.

Patent Literature 2 describes an infrared-cut filter made up of an infrared absorber and infrared reflector which are bonded together. The infrared absorber is produced by forming an anti-reflection film (AR coating) on one principal surface of an infrared-absorbing glass. The infrared-absorbing glass is a blue glass in which a coloring matter such as copper ion is dispersed. The anti-reflection film is formed by using a vacuum deposition apparatus to vacuum-deposit a single layer film made of $MgF_2$, multilayer film made of $Al_2O_3$, $ZrO_2$, and $MgF_2$, or multilayer film made of $TiO_2$ and $SiO_2$ on a principal surface of the infrared-absorbing glass. The infrared reflector is produced by forming an infrared-reflecting film on a principal surface of a transparent substrate. The infrared-reflecting film is a multilayer film composed of first thin films made of a high refractive index material such as $TiO_2$ and second thin films made of a low refractive index material such as $SiO_2$, the first and second thin films being alternately laminated on top of each other.

Patent Literature 3 describes an optical film having a near-infrared-absorbing layer including a transparent resin containing a given organic dye.

Patent Literature 4 describes an optical filter including a near-infrared-absorbing layer containing at least one component selected from: a component composed of a given phosphoric acid ester compound and copper ion; and a phosphoric acid ester-copper compound obtained by a reaction between a given phosphoric acid ester compound and copper compound. The near-infrared-absorbing layer may be formed from a resin composition including a resin such as an acrylic resin that contains the above component(s).

CITATION LIST

Patent Literature

Patent Literature 1: JP 2001-42230 A
Patent Literature 2: WO 2011/158635 A1
Patent Literature 3: JP 2008-165215 A
Patent Literature 4: JP 2001-154015 A

SUMMARY OF INVENTION

Technical Problem

The techniques described in Patent Literatures 1 and 2 involve forming an interference film such as a reflective cut coating or anti-reflection film to obtain desired infrared absorption properties. The technique of Patent Literature 3 may require incorporating a plurality of organic dyes into the transparent resin to achieve desired infrared absorption properties, since the given organic dye can absorb only infrared light of a limited range of wavelengths. However, dispersing a plurality of organic dyes in a transparent resin is often difficult, and this may necessitate using a reflective filter to complement the absorption performance for a range of wavelengths in the infrared region.

The technique described in Patent Literature 4 is advantageous in the following respects. First, a compound composed of a phosphoric acid compound such as a phosphoric acid ester and copper ion can have absorption properties appropriate for light in the infrared region, and an optical product with optical properties more compatible with the visual sensitivity of humans can be produced by dispersing such a compound in a matrix component. An optical filter (infrared-cut filter) containing the compound composed of a phosphoric acid-based compound and copper ion as an infrared-absorbing component is unlikely to cause problems in terms of heat resistance and weather resistance and is superior in terms of flexibility in the design of optical properties, workability, adaptability to many kinds of products, and manufacturing cost. However, the optical filter described in Patent Literature 4 by no means has a sufficiently high light transmittance at a particular range of wavelengths in the visible region (wavelengths of about 400 nm to 600 nm).

Infrared-cut filters are required to have a high light transmittance at a particular range of wavelengths in the visible region (wavelengths of 400 nm to 600 nm, for example). If an infrared-cut filter contains an increased amount of the compound which is described in Patent Literature 4 and which is composed of a phosphoric acid-based compound such as a compound comprising phosphoric acid ester and copper ion, the infrared absorption ability of the infrared-cut filter increases, whereas the light transmittance of the infrared-cut filter at a particular range of wavelengths in the visible region decreases. If an infrared-cut filter contains a decreased amount of the compound which is described in Patent Literature 4 and which is composed of a phosphoric acid-based compound such as a phosphoric acid ester and copper ion, the light transmittance of the infrared-cut filter at a particular range of wavelengths in the visible region increases, whereas the infrared absorption ability of the infrared-cut filter decreases and the infrared-side cut-off wavelength increases. Namely, in the technique described in Patent Literature 4, there is a trade-off relation between the improvement in infrared absorption ability and the increase in light transmittance at a particular range of wavelengths in the visible region. The "infrared-side cut-off wavelength" is defined herein as a wavelength at which the transmittance is 50% and which, in a spectral transmittance curve having a single transmission band in the visible region, lies in a range where transition from transmission band to blocking band occurs with increasing wavelength. An "ultraviolet-side cut-off wavelength" is defined herein as a wavelength at which the transmittance is 50% and which, in the spectral transmittance curve, lies in a range where transition from blocking band to transmission band occurs with increasing wavelength.

In view of such circumstances, the present invention aims to provide an infrared-absorbing composition that contains an infrared absorber formed by a phosphoric acid-based compound and copper ion and that is advantageous in increasing the light transmittance at a particular range of wavelengths in the visible region and shortening the infrared-side cut-off wavelength (to 700 nm or less, for example).

Solution to Problem

The present invention provides an infrared-absorbing composition including:
an infrared absorber formed by a phosphonic acid represented by the following formula (a) and copper ion:

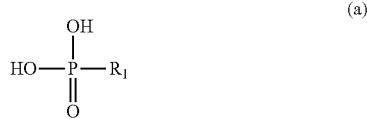

(a)

wherein $R_1$ is a phenyl group or a phenyl group in which at least one hydrogen atom is substituted by a halogen atom; and
a phosphoric acid ester including at least one of a phosphoric acid diester and a phosphoric acid monoester and allowing the infrared absorber to be dispersed, wherein
when molar contents of the phosphonic acid, the copper ion, and the phosphoric acid ester are respectively defined as $C_A$ mol, $C_C$ mol, and $C_E$ mol and a total molar content of reactive hydroxy groups including two hydroxy groups contained in one molecule of the phosphonic acid, one hydroxy group contained in one molecule of the phosphoric acid diester, and one hydroxy group contained in one molecule of the phosphoric acid monoester is defined as $C_H$ mol, the relations $C_A/C_E<1$ and $C_H/C_C>1.95$ are satisfied.

The present invention also provides an infrared-cut filter including:
a transparent dielectric substrate; and
an infrared-absorbing layer provided on at least one principal surface of the transparent dielectric substrate and formed by the above infrared-absorbing composition.

The present invention further provides an imaging optical system including the above infrared-cut filter.

Advantageous Effects of Invention

The above infrared-absorbing composition includes an infrared absorber formed by a phosphoric acid-based compound and copper ion and is advantageous in increasing the light transmittance at a particular range of wavelengths in the visible region and shortening the infrared-side cut-off wavelength (to 700 nm or less, for example).

DESCRIPTION OF EMBODIMENTS

Figure 1:
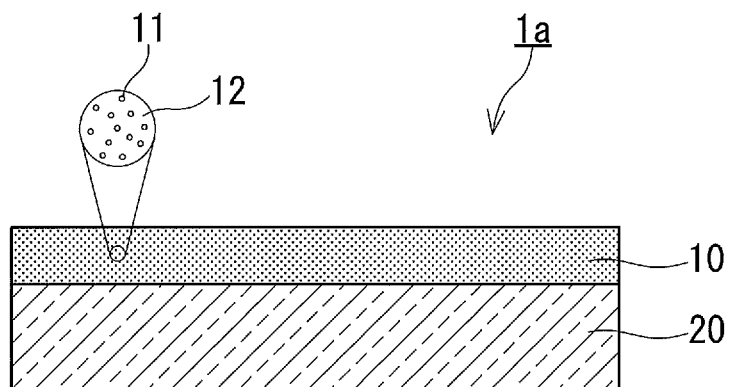
FIG. 1 is a cross-sectional view of an infrared-cut filter according to an example of the present invention.

Hereinafter, an embodiment of the present invention will be described with reference to the drawings. The following description relates to examples of the present invention, and the present invention is not limited by the examples.

An infrared-absorbing composition according to the present invention includes: an infrared absorber formed by a phosphonic acid represented by the formula (a) below and copper ion; and a phosphoric acid ester allowing the infrared absorber to be dispersed. In the formula (a), $R_1$ is a phenyl group or a phenyl group in which at least one hydrogen atom is substituted by a halogen atom. The phosphoric acid ester includes at least one of a phosphoric acid diester and a phosphoric acid monoester.

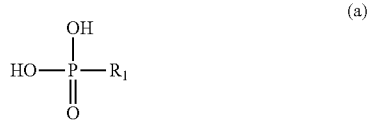

(a)

Through a great deal of trial and error, the present inventors have found that an infrared-absorbing composition advantageous in increasing the light transmittance at a particular range of wavelengths in the visible region (wavelengths of 400 nm to 600 nm) can be obtained by forming an infrared absorber with the use of copper ion and a particular phosphonic acid and dispersing the infrared absorber with the use of a phosphoric acid ester. The present inventors have also found that the use of a phosphonic acid represented by the formula (a) as the particular phosphonic acid makes the infrared-side cut-off wavelength of an infrared-cut filter more likely to be controlled to 700 nm or less than the use of another kind of phosphonic acid. The present inventors have further found that the use of a phosphonic acid represented by the formula (a) as the particular phosphonic acid makes the ultraviolet-side cut-off wavelength more likely to be controlled to around 380 nm (from 370 nm to 390 nm, for example) than the use of another kind of phosphonic acid, and makes it possible to obtain an infrared-absorbing composition advantageous in producing an optical product with optical properties relatively compatible with the visual sensitivity of humans. The infrared-absorbing composition according to the present invention has been invented based on these findings.

The phosphoric acid ester contained in the infrared-absorbing composition is not particularly limited, as long as the phosphoric acid ester allows the infrared absorber to be properly dispersed. For example, the phosphoric acid ester includes at least one of a phosphoric acid diester represented by the formula (b1) below and a phosphoric acid monoester represented by the formula (b2) below. This can ensure that the infrared absorber is dispersed in the infrared-absorbing composition without aggregation. In the formula (b1) and formula (b2), $R_{21}$, $R_{22}$, and $R_3$ are each a monovalent functional group represented by $-(CH_2CH_2O)_nR_4$ wherein n is an integer of 1 to 25 and $R_4$ is an alkyl group with 6 to 25 carbon atoms. $R_{21}$, $R_{22}$, and $R_3$ are the same or different functional groups.

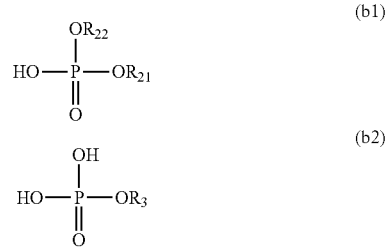

The infrared absorber is formed, for example, by coordination of a phosphonic acid represented by the formula (a) to copper ion. In the infrared-absorbing composition, for example, fine particles containing at least the infrared absorber are formed. In this case, due to the function of the phosphoric acid ester, the fine particles are dispersed in the infrared-absorbing composition without aggregation. The average particle diameter of the fine particles is, for example, 5 nm to 200 nm. When the average particle diameter of the fine particles is 5 nm or more, any particular ultramicronization process for obtaining the fine particles is not required, and there is a small risk that the structure of the fine particles containing at least the infrared absorber will be broken. Additionally, the fine particles are successfully dispersed in the infrared-absorbing composition. When the average particle diameter of the fine particles is 200 nm or less, it is possible to reduce the influence of Mie scattering, increase the visible transmittance of an infrared-cut filter, and prevent deterioration of the properties such as contrast and haze of an image captured by an imaging apparatus. The average particle diameter of the fine particles is desirably 100 nm or less. In this case, the influence of Rayleigh scattering is reduced, and thus an infrared-absorbing layer formed using the infrared-absorbing composition has an increased transparency to visible light. The average particle diameter of the fine particles is more desirably 75 nm or less. In this case, the transparency of the infrared-absorbing layer to visible light is especially high. The average particle diameter of the fine particles can be measured by a dynamic light scattering method.

When the molar contents of the phosphonic acid represented by the formula (a) and the phosphoric acid ester in the infrared-absorbing composition are respectively defined as $C_A$ mol and $C_E$ mol, the infrared-absorbing composition satisfies the relation $C_A/C_E<1$. This allows the successful dispersion of the infrared absorber formed by the phosphonic acid represented by the formula (a) and copper ion. The infrared-absorbing composition more desirably satisfies the relation $0.20 \leq C_A/C_E \leq 0.85$. In this case, the infrared absorber can be properly formed by the phosphonic acid represented by the formula (a) and copper ion and can be successfully dispersed. When the total molar content of reactive hydroxy groups including two hydroxy groups contained in one molecule of the phosphonic acid represented by the formula (a), one hydroxy group contained in one molecule of the phosphoric acid diester, and one hydroxy group contained in one molecule of the phosphoric acid monoester is defined as $C_H$ mol, the infrared-absorbing composition further satisfies the relation $C_H/C_C>1.95$. $C_H/C_C$ is, for example, 3.5 or less. The use of such an infrared-absorbing composition allows production of an infrared-cut filter having high light transmittance at a particular range of wavelengths in the visible region. In other words, the use of the infrared-absorbing composition satisfying the relations $C_A/C_E<1$ and $C_H/C_C>1.95$ allows production of an infrared-cut filter having high light transmittance at a particular range of wavelengths in the visible region and having an infrared-side cut-off wavelength of, for example, 700 nm or less. The infrared-absorbing composition desirably satisfies the relation $C_H/C_C>2.0$. If, for example, $C_H/C_C$ is 1.90 or less, the light transmittance of the infrared-cut filter at a wavelength of 400 nm is difficult to increase. If $C_H/C_C$ is more than about 2.5, the light transmittance of the infrared-cut filter at a wavelength of 400 nm may be relatively low within an acceptable range.

The infrared-absorbing composition desirably satisfies the relation $C_H/C_C \geq 2.842 - 0.765 \times C_A/C_E$. This can ensure that the use of the infrared-absorbing composition allows production of an infrared-cut filter having high light transmittance at a particular range of wavelengths in the visible region and having an infrared-side cut-off wavelength of 660 nm or less. The reactive hydroxy groups are specified in terms of reactivity with copper ion. Both of the two hydroxy groups contained in one molecule of the phosphonic acid represented by the formula (a) are considered reactive with copper ion. The one hydroxy group contained in one molecule of the phosphoric acid diester is considered reactive with copper ion. Only one of the two hydroxy groups contained in one molecule of the phosphoric acid monoester is considered reactive with copper ion. For example, when the phosphoric acid monoester is represented by the formula (b2), $R_3$ in the formula (b2) includes an oxyethylene group or polyoxyethylene group and an alkyl group with 6 or more carbon atoms. It is therefore considered that the phosphoric acid monoester tends to undergo steric hindrance in a reaction with copper ion and, at most, only one of the hydroxy groups contained in one molecule of the phosphoric acid monoester can participate in the reaction with copper ion.

If reactive hydroxy groups are not sufficiently supplied in preparation of an infrared-absorbing composition, the phosphonic acid represented by the formula (a) and copper ion have difficulty interacting with each other due to the steric hindrance of the phenyl group which is relatively bulky or the steric hindrance of the phenyl group in which at least one hydrogen atom is substituted by a halogen atom and which is relatively bulky, with the result that the formation of a complex of the phosphoric acid ester and copper ion may be dominant. In this case, it is considered that the infrared-side cut-off wavelength of an infrared-cut filter tends to lengthen due to the infrared absorption effect of the complex of the phosphoric acid ester and copper ion. Thus, to produce an infrared-cut filter having a cut-off wavelength of 660 nm or less, the relation $C_H/C_C \geq 2.842 - 0.765 \times C_A/C_E$ is desirably satisfied in the infrared-absorbing composition.

The source material of copper ion in the infrared-absorbing composition is, for example, a copper salt. The copper salt is, for example, copper acetate or a hydrate of copper acetate. Examples of the copper salt include anhydrides and hydrates of copper chloride, copper formate, copper stearate, copper benzoate, copper pyrophosphate, copper naphthenate, and copper citrate. For example, copper acetate monohydrate is represented by $Cu(CH_3COO)_2 \cdot H_2O$, and 1 mol of copper acetate monohydrate supplies 1 mol of copper ion.

The infrared-absorbing composition according to the present invention further includes, for example, a matrix component. The matrix component is, for example, a resin that is transparent to visible light and infrared light and in which the fine particles described above are dispersible.

When the infrared-absorbing composition includes the matrix component, the content of the phosphonic acid represented by the formula (a) is, for example, 3 to 60 parts by mass with respect to 100 parts by mass of the matrix component in the infrared-absorbing composition.

When the infrared-absorbing composition includes the matrix component, the matrix component is desirably a polysiloxane (silicone resin). This allows an increase in the heat resistance of an infrared-absorbing layer formed by the infrared-absorbing composition. Specific examples of polysiloxanes that can be used as the matrix component include KR-255, KR-300, KR-2621-1, KR-211, KR-311, KR-216, KR-212, and KR-251. All of these are silicone resins manufactured by Shin-Etsu Chemical Co., Ltd. Other resins such as an acrylic resin, epoxy resin, and vinyl acetal resin can also be used as the matrix component. These resins may contain any of a monofunctional or polyfunctional monomer, oligomer, or polymer as a structural unit.

An exemplary method for preparing the infrared-absorbing composition according to the present invention will be described. First, a copper salt such as copper acetate monohydrate is added to a given solvent such as tetrahydrofuran (THF), which is stirred to obtain a copper salt solution. A phosphoric acid ester compound such as a phosphoric acid diester represented by the formula (b1) or a phosphoric acid monoester represented by the formula (b2) is then added to the copper salt solution, which is stirred to prepare a liquid A. A phosphonic acid represented by the formula (a) is added to a given solvent such as THF, which is stirred to prepare a liquid B. Next, the liquid B is added to the liquid A while the liquid A is stirred, and the mixture of the liquids is stirred for a given period of time. To the resulting solution was then added a given solvent such as toluene, and the solution is stirred to obtain a liquid C. Next, the liquid C is subjected to solvent removal under heating. As a result, the solvents such as THF and the component such as acetic acid (boiling point: about 118° C.) which is generated by dissociation of the copper salt are removed, and an infrared absorber is formed by the phosphonic acid represented by the formula (a) and copper ion. The temperature of heating of the liquid C is set based on the boiling point of the component which is generated by dissociation of the copper salt and which is to be removed. During the solvent removal, the solvent such as toluene (boiling point: about 110° C.) used to obtain the liquid C is also evaporated. It is desirable that a certain amount of this solvent should remain in the infrared-absorbing composition. This is preferably taken into account in determining the amount of the solvent to be added and the time to be spent on the solvent removal. To obtain the liquid C, o-xylene (boiling point: about 144° C.) may be used instead of toluene. In this case, the amount of o-xylene to be added can be reduced to about one-fourth of the amount of toluene to be added since the boiling point of o-xylene is higher than that of toluene.

If necessary, the solvent removal from the liquid C is followed by addition of a matrix component such as a polysiloxane (silicone resin) and then by stirring for a given period of time. This is an example of how to prepare the infrared-absorbing composition according to present invention. The solvents used in the preparation of the infrared-absorbing composition desirably have certain polarities to allow an infrared absorber to be properly formed by the phosphonic acid represented by the formula (a) and copper ion. This is because the polarities of the solvents influence how the fine particles containing at least the infrared absorber are dispersed in the infrared-absorbing composition. For example, solvents with suitable polarities are selected according to the type of the phosphoric acid ester used in the preparation of the liquid A.

Infrared-cut filters 1a to 1d according to examples of the present invention include a transparent dielectric substrate 20 and an infrared-absorbing layer 10, as shown in FIGS. 1 to 4. The infrared-absorbing layer 10 is provided on at least one principal surface of the transparent dielectric substrate 20 and formed by the infrared-absorbing composition according to the present invention. In the infrared-absorbing layer 10, as shown in FIG. 1, fine particles 11 containing at least an infrared absorber are dispersed in a matrix 12. The transparent dielectric substrate 20 is, for example, a transparent glass substrate. The thickness of the infrared-absorbing layer 10 is, for example, 40 μm to 900 μm. This can ensure that the infrared-cut filters 1a to 1d exhibit desired optical properties. When the thickness of the infrared-absorbing layer 10 is, for example, about 500 μm, the near-infrared transmittance at a wavelength of around 700 nm is likely to be less than 3%. To enhance the reliability of the infrared-cut filters 1a to 1d, the thickness of the infrared-absorbing layer 10 may be controlled to about 900 μm by increasing the relative proportion of the matrix 12.

The infrared-cut filters 1a to 1d have, for example, all of the following features (i) to (iii).

(i) The light transmittance at a particular range of wavelengths in the visible region (wavelengths of 400 nm to 600 nm) is about 70% or more and can be 75% or more.

(ii) The infrared-side cut-off wavelength is 700 nm or less and can be 660 nm or less.

(iii) The ultraviolet-side cut-off wavelength is 370 to 390 nm.

The infrared-cut filters 1a to 1d with the features (i) to (iii) have desired properties as an infrared-cut filter to be disposed ahead of an imaging sensor in an imaging optical system of an imaging apparatus such as a digital camera. An infrared-cut filter used in an imaging optical system of an imaging apparatus such as a digital camera is desirably capable of shielding against as much light as possible in a wavelength range over which the visual sensitivity is relatively low. It is therefore significant that the infrared-side cut-off wavelength of the infrared-cut filter is less than 700 nm which is an effective upper threshold for the visual sensitivity. To make the optical properties of the infrared-cut filter more compatible with the visual sensitivity of humans, it is desirable for the infrared-cut filter to have an infrared-side cut-off wavelength of 660 nm or less in addition to possessing the feature (i). It is also significant that the infrared-cut filter shields against light of wavelengths less than 380 nm, since the lower threshold for the visual sensitivity is around 380 nm. Thus, the infrared-cut filters 1a to 1d with the features (ii) and (iii) have optical properties compatible with the visual sensitivity of humans.

An exemplary method for producing the infrared-cut filters 1a to 1d will be described. First, the infrared-absorbing composition in a liquid form is applied to one principal surface of the transparent dielectric substrate 20 by spin coating or with a dispenser to form a film. This film is then subjected to a given heat treatment and thus hardened. The infrared-cut filters 1a to 1d can be produced in this manner. To strengthen the matrix 12 of the infrared-absorbing layer 10 while improving the optical properties of the infrared-cut filters 1a to 1d, the maximum of the ambient temperature during the heat treatment of the film is, for example, 140° C. or higher and desirably 160° C. or higher. The maximum of the ambient temperature during the heat treatment of the film is, for example, 170° C. or lower.

Figure 2:
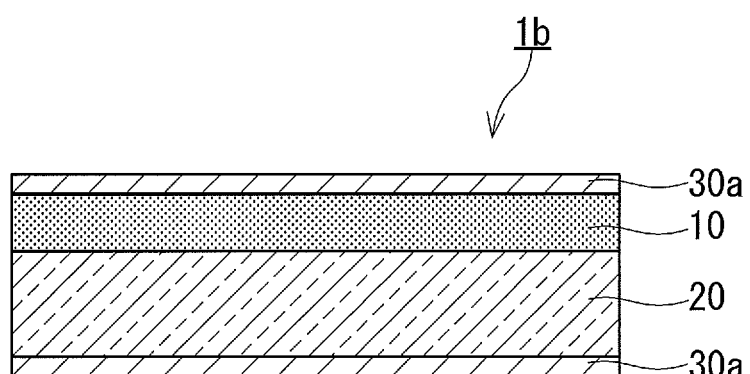
FIG. 2 is a cross-sectional view of an infrared-cut filter according to another example of the present invention.

The infrared-cut filter 1b according to another example of the present invention includes anti-reflection films 30a on both principal surfaces, as shown in FIG. 2. The infrared-cut filter 1b has the same configuration as the infrared-cut filter 1a, except for including the anti-reflection films 30a. Thus, the infrared-cut filter 1b can eliminate Fresnel reflection light causing stray light and can also increase the amount of transmitted light in the visible region. Various parameters such as the refractive index and thickness of the anti-reflection film 30a can be optimized by a known technique based on the refractive index of the transparent dielectric substrate 20 or infrared-absorbing layer 10. The anti-reflection film 30a is a single-layer film or a multilayer film. When the anti-reflection film 30a is a single-layer film, the anti-reflection film 30a is desirably made of a material having a refractive index lower than the refractive index of the transparent dielectric substrate 20 or infrared-absorbing layer 10. The anti-reflection film 30a may be made of a material having a refractive index equal to or higher than the refractive index of the transparent dielectric substrate 20 or infrared-absorbing layer 10. When the anti-reflection film 30a is a multilayer film, the anti-reflection film 30a is formed by alternately laminating two or more materials having different refractive indices. Examples of materials for forming the anti-reflection film 30a include inorganic materials such as $SiO_2$, $TiO_2$, and $MgF_2$ and organic materials such as fluorine resins. The method for forming the anti-reflection film 30a is not particularly limited, and any of the following methods can be used depending on the type(s) of the material(s) for forming the anti-reflection film 30a: vacuum deposition, sputtering, chemical vapor deposition (CVD), and sol-gel process employing spin coating or spray coating.

Figure 3:
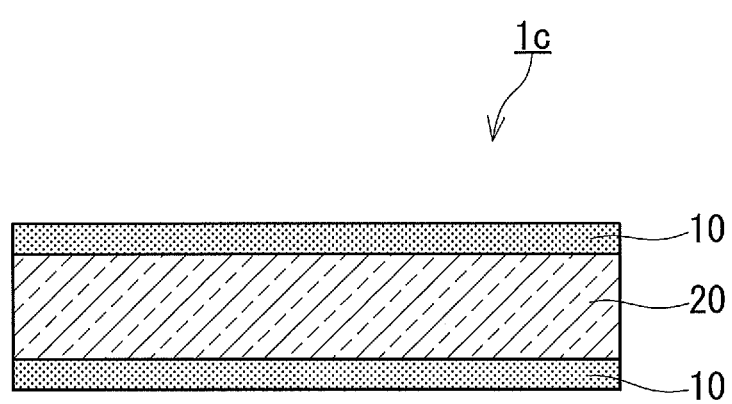
FIG. 3 is a cross-sectional view of an infrared-cut filter according to still another example of the present invention.

In the infrared-cut filter 1c according to still another example of the present invention, as shown in FIG. 3, the infrared-absorbing layers 10 are formed on both principal surfaces of the transparent dielectric substrate 20. Thus, an infrared-absorbing layer thickness required of the infrared-cut filter 1c to have desired optical properties can be achieved by the two infrared-absorbing layers 10 rather than by one infrared-absorbing layer 10. The thicknesses of the infrared-absorbing layers 10 on both principal surfaces of the transparent dielectric substrate 20 may be the same or different. That is, the infrared-absorbing layers 10 are formed on both principal surfaces of the transparent dielectric substrate 20 so that the infrared-absorbing layers 10 account for equal or unequal proportions of the total thickness of the infrared-absorbing layers required of the infrared-cut filter 1c to have desired optical properties. Thus, the thickness of each of the infrared-absorbing layers 10 formed on both principal surfaces of the transparent dielectric substrate 20 is relatively small. This can prevent thickness non-uniformity which can occur when the thickness of the infrared-absorbing layer is large. Additionally, it is possible to shorten the time spent on the application of the infrared-absorbing composition in a liquid form and shorten the time taken for hardening of the film of the infrared-absorbing composition applied. If the infrared-absorbing layer 10 is formed only on one principal surface of the transparent dielectric substrate 20 that is very thin, the resulting infrared-cut filter may be warped due to a stress induced by contraction occurring during formation of the infrared-absorbing layer 10 from the infrared-absorbing composition. The formation of the infrared-absorbing layers 10 on both principal surfaces of the transparent dielectric substrate 20 prevents warping of the infrared-cut filter 1c even when the transparent dielectric substrate 20 is very thin.

Figure 4:
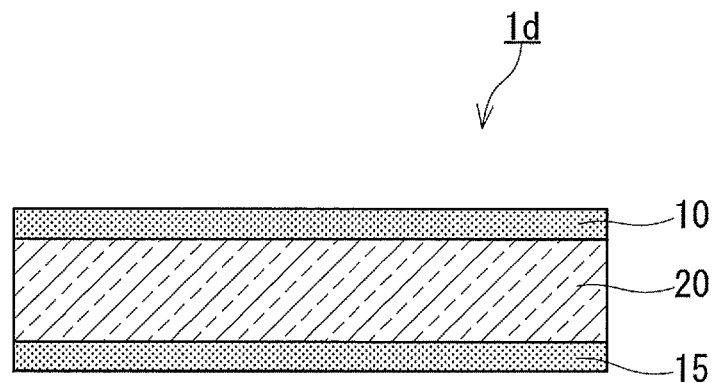
FIG. 4 is a cross-sectional view of an infrared-cut filter according to still another example of the present invention.

The infrared-cut filter 1d according to still another example of the present invention further includes an infrared-absorbing layer 15, as shown in FIG. 4. The infrared-absorbing layer 15 is formed on the principal surface opposite to the principal surface on which the infrared-absorbing layer 10 is formed. The infrared-absorbing layer 15 is formed by an infrared-absorbing composition different from the infrared-absorbing composition according to the present invention. The infrared-absorbing layer 15 is formed, for example, by an infrared-absorbing composition prepared in the same manner as the infrared-absorbing composition according to the present invention except for using, instead of the phosphonic acid represented by the formula (a), a phosphonic acid represented by a formula derived from the formula (a) by substituting $R_1$ by an alkyl group with 1 to 6 carbon atoms.

Figure 5:
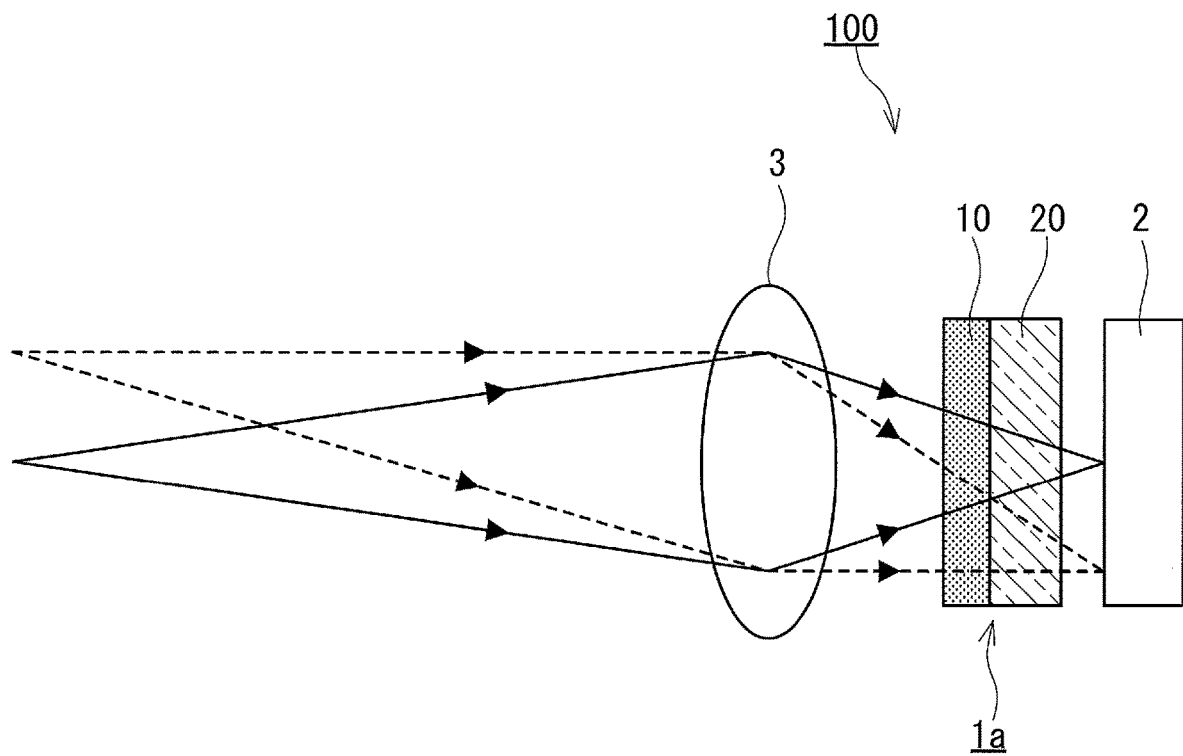
FIG. 5 is a diagram showing an imaging optical system according to an example of the present invention.

An imaging optical system 100 according to the present invention includes, for example, the infrared-cut filter 1a, as shown in FIG. 5. The imaging optical system 100 further includes, for example, an imaging lens 3. The imaging optical system 100 is disposed ahead of an imaging sensor 2 in an imaging apparatus such as a digital camera. The imaging sensor 2 is, for example, a solid-state imaging sensor such as a CCD or CMOS. As shown in FIG. 5, light coming from an object is focused by the imaging lens 3, the infrared portion of the light is cut by the infrared-cut filter 1a, and then the light is incident on the imaging sensor 2. A favorable image with good color reproduction can thus be obtained. The imaging optical system 100 may include any of the infrared-cut filter 1b, infrared-cut filter 1c, and infrared-cut filter 1d instead of the infrared-cut filter 1a.

EXAMPLES

The present invention will be described in more detail with Examples. The present invention is not limited to Examples given below. First, methods for evaluation of Examples and Comparative Examples will be described.

<Spectral Transmittance of Infrared-Cut Filter>

Transmittance spectra of infrared-cut filters according to Examples and Comparative Examples were measured using an ultraviolet-visible spectrophotometer (manufactured by JASCO Corporation under the product name "V-670"). In this measurement, the incident angle of light on the infrared-cut filters was set to 0° (degree). To eliminate the influence of the difference in infrared-absorbing layer thickness among the infrared-cut filters according to Examples and Comparative Examples, measured values of spectral transmittance were multiplied by 100/92 to cancel the effect of interfacial reflection, and a coefficient was determined so that the average transmittance in the wavelength range of 820 to 840 nm was calculated to be 1%. Furthermore, values of transmittance at different wavelengths were converted to values of absorbance, which were corrected by multiplication by the determined coefficient to calculate the spectral transmittance. Namely, the transmittance spectrum obtained for each infrared-cut filter was one which was normalized so that the average transmittance in the wavelength range of 820 to 840 nm was 1% and from which the effect of reflection at the interface between the infrared-cut filter and air was canceled.

Example 1

(Preparation of Infrared-Absorbing Composition)

An amount of 1.125 g (5.635 millimoles (this unit will hereinafter be written as "mmol")) of copper acetate monohydrate and 60 g of tetrahydrofuran (THF) were mixed and stirred for 3 hours to obtain a copper acetate solution. Next, 2.338 g (7.035 mmol) of PLYSURF A208F (manufactured by DKS Co., Ltd.), which is a phosphoric acid ester compound, was added to the obtained copper acetate solution, which was stirred for 30 minutes to obtain a liquid A. A liquid B was separately obtained by addition of 10 g of THF to 0.585 g (3.699 mmol) of phenylphosphonic acid (manufactured by Nissan Chemical Industries, Ltd.), followed by stirring for 30 minutes. PLYSURF A208F was a phosphoric acid ester compound including phosphoric acid esters represented by the formulae (b1) and (b2) wherein $R_{21}$, $R_{22}$, and $R_3$ are the same and represented by $(CH_2CH_2O)_nR_4$ wherein n is 1 and $R_4$ is a monovalent group with 8 carbon atoms. The molecular weight of PLYSURF A208F was calculated by assuming that PLYSURF A208F includes the phosphoric acid diester represented by the formula (b1) and the phosphoric acid monoester represented by the formula (b2) in a molar ratio of 1:1.

Next, the liquid B was added to the liquid A while the liquid A was stirred, and the mixture was stirred at room temperature for 1 minute. Next, 45 g of toluene was added to the resulting solution, which was stirred at room temperature for 1 minute to obtain a liquid C. This liquid C was placed in a flask and subjected to solvent removal using a rotary evaporator (manufactured by Tokyo Rikakikai Co. Ltd. under the model code "N-1110SF") for 25 minutes under heating by an oil bath (manufactured by Tokyo Rikakikai Co. Ltd. under the model code "OSB-2100"). The temperature of the oil bath was set to 120° C. After that, the solution having undergone the solvent removal was taken out of the flask. An amount of 4.400 g of silicone resin (manufactured by Shin-Etsu Chemical Co., Ltd. under the product name "KR-300") was added to the solution, which was stirred at room temperature for 30 minutes to obtain an infrared-absorbing composition according to Example 1.

(Production of Infrared-Cut Filter)

Figure 6:
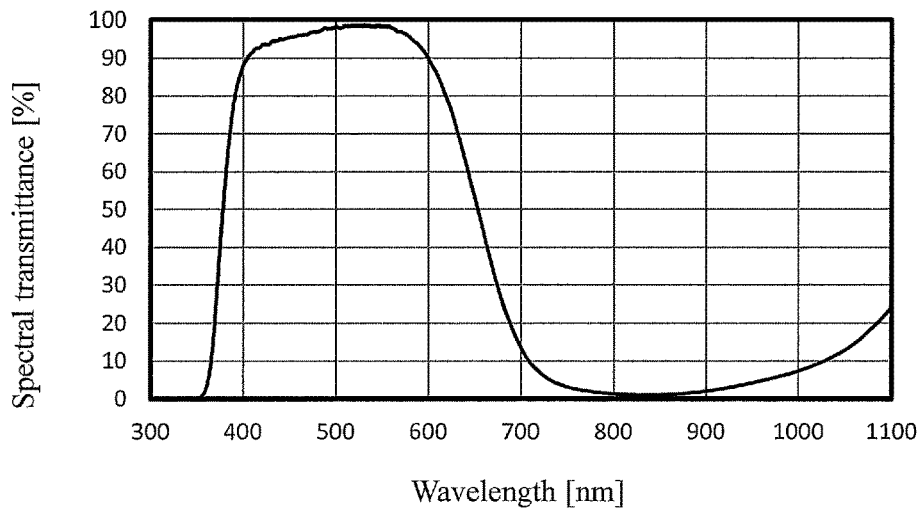
FIG. 6 is a transmittance spectrum of an infrared-cut filter according to Example 1.
Figure 7:
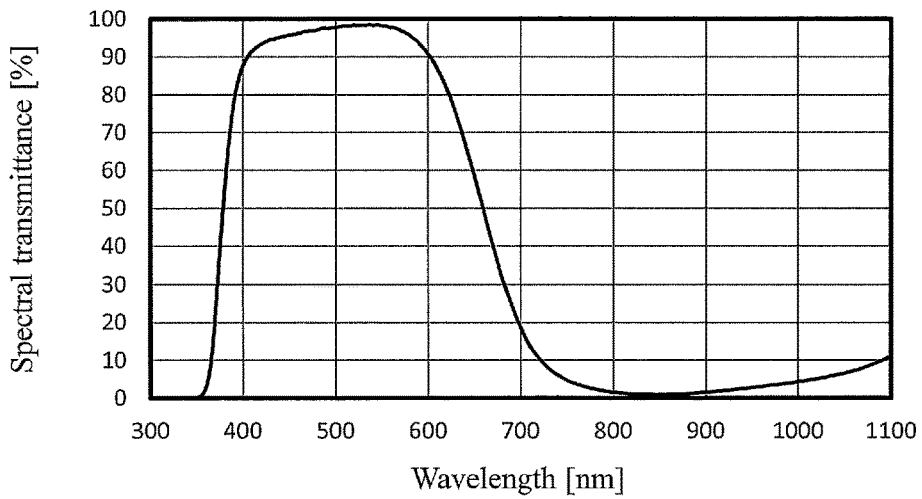
FIG. 7 is a transmittance spectrum of an infrared-cut filter according to Example 2.
Figure 8:
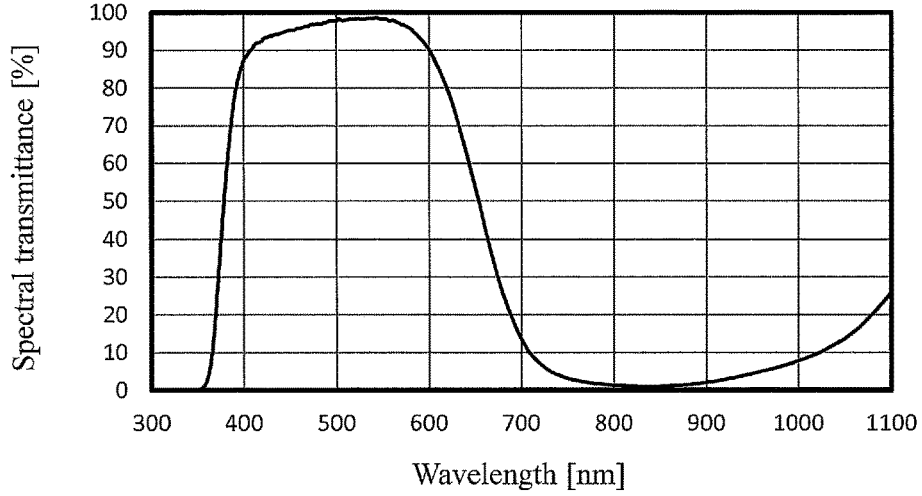
FIG. 8 is a transmittance spectrum of an infrared-cut filter according to Example 3.
Figure 9:
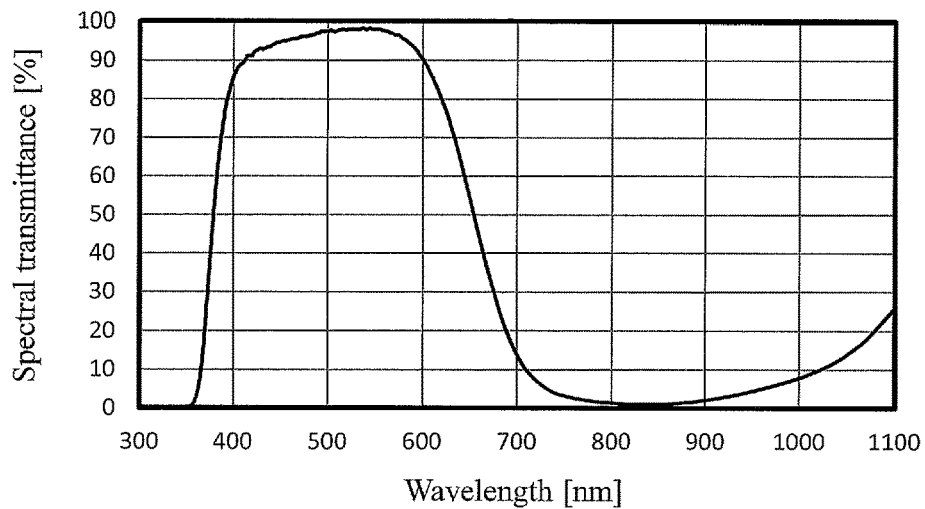
FIG. 9 is a transmittance spectrum of an infrared-cut filter according to Example 4.
Figure 10:
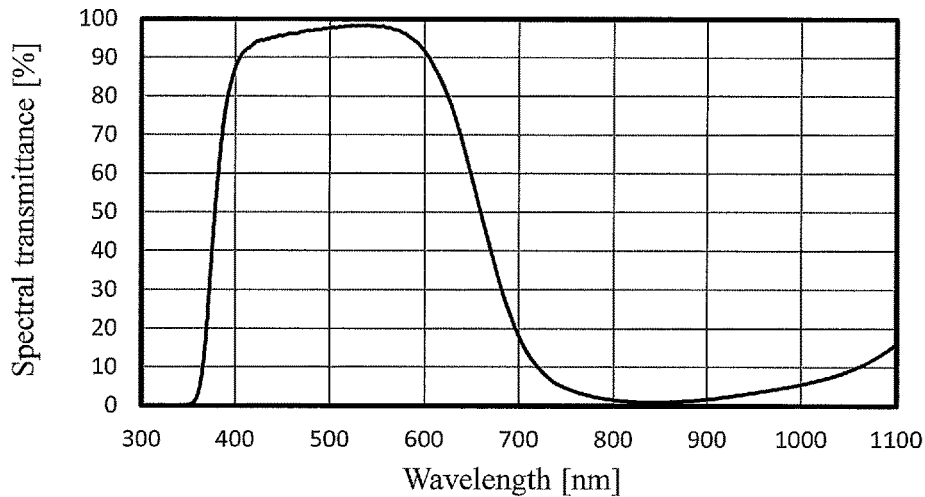
FIG. 10 is a transmittance spectrum of an infrared-cut filter according to Example 5.
Figure 11:
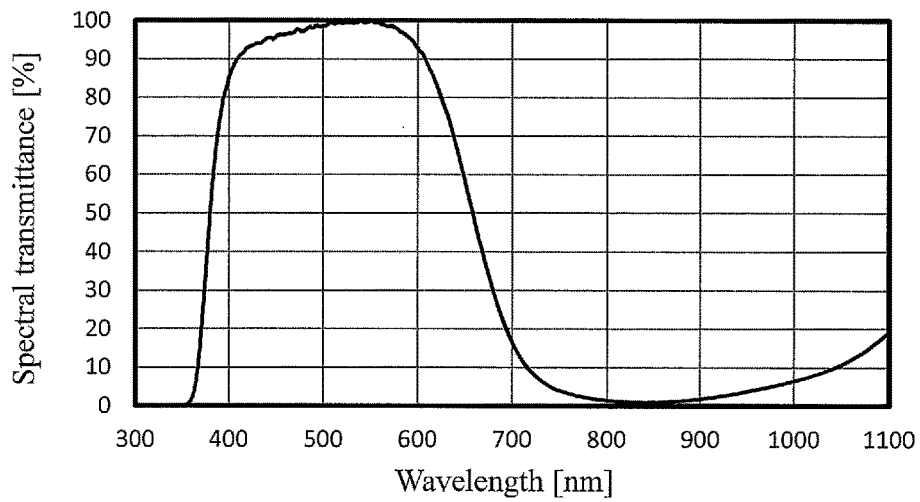
FIG. 11 is a transmittance spectrum of an infrared-cut filter according to Example 6.
Figure 12:
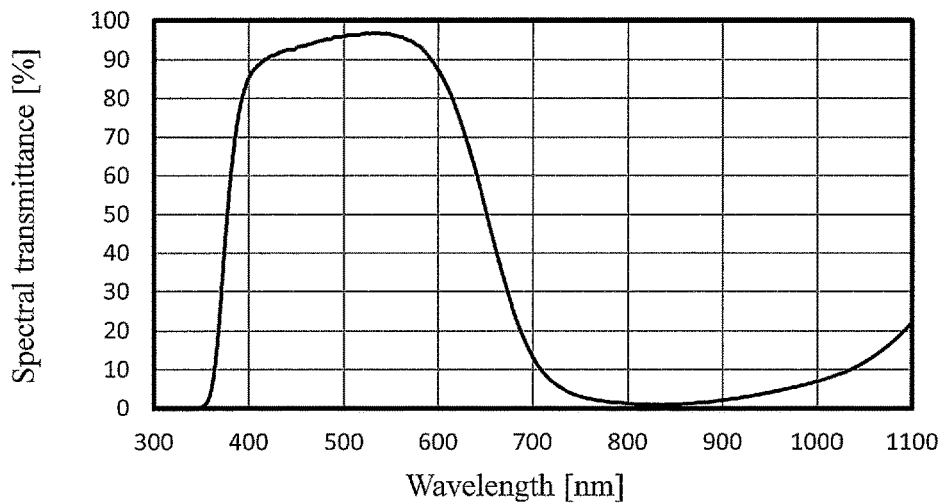
FIG. 12 is a transmittance spectrum of an infrared-cut filter according to Example 7.
Figure 13:
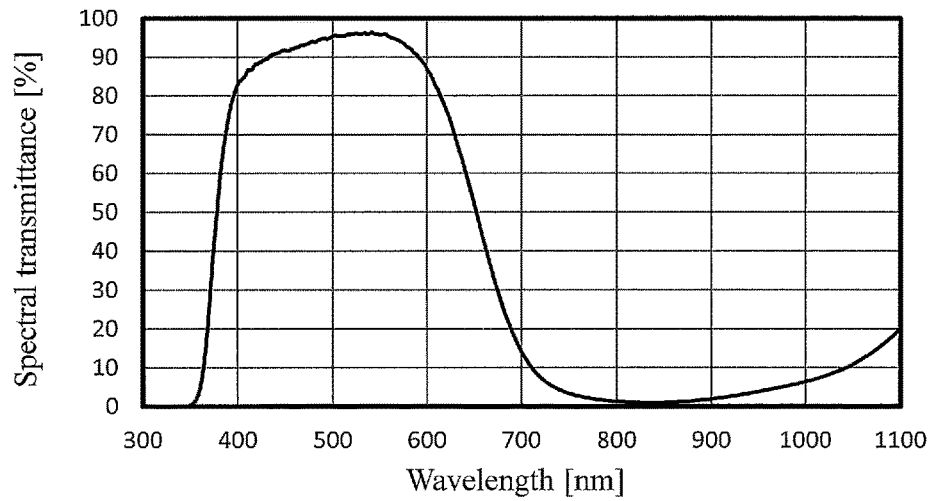
FIG. 13 is a transmittance spectrum of an infrared-cut filter according to Example 8.
Figure 14:
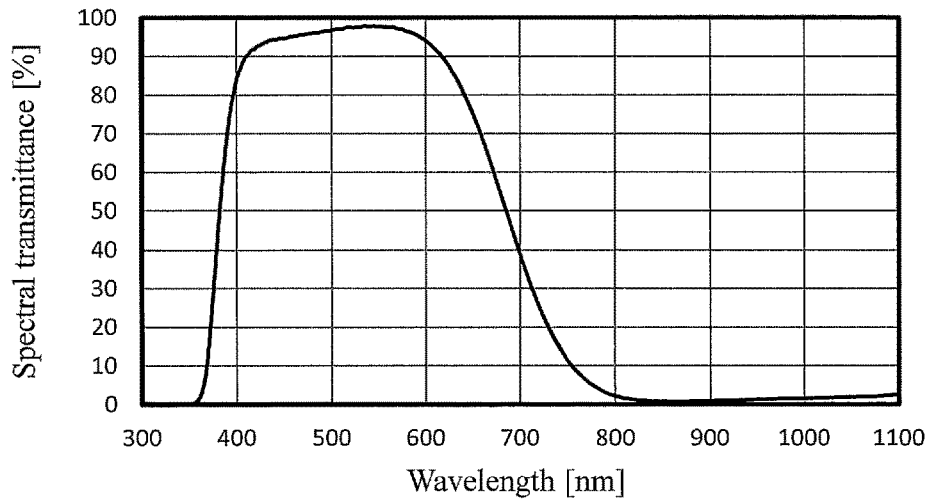
FIG. 14 is a transmittance spectrum of an infrared-cut filter according to Example 9.
Figure 15:
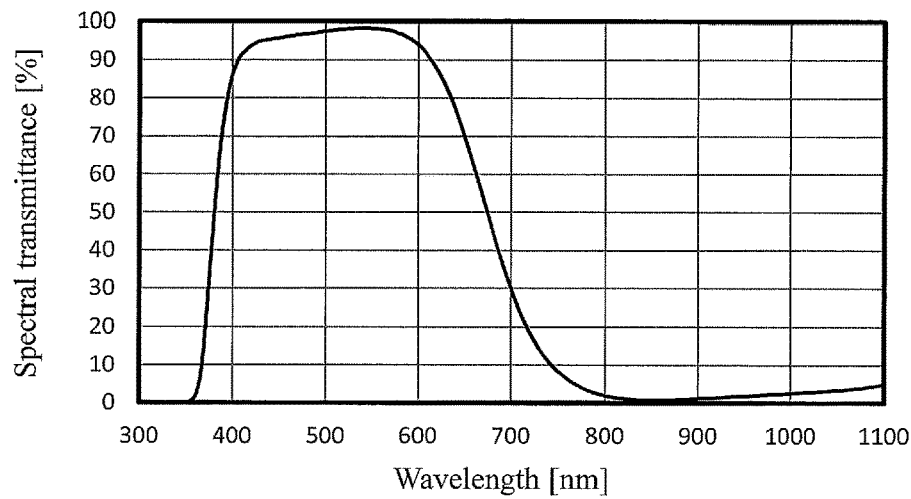
FIG. 15 is a transmittance spectrum of an infrared-cut filter according to Example 10.
Figure 16:
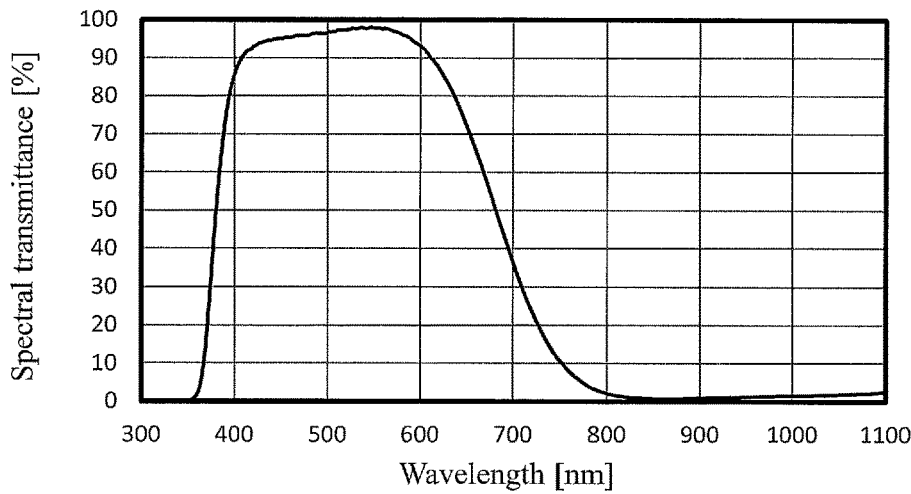
FIG. 16 is a transmittance spectrum of an infrared-cut filter according to Example 11.
Figure 17:
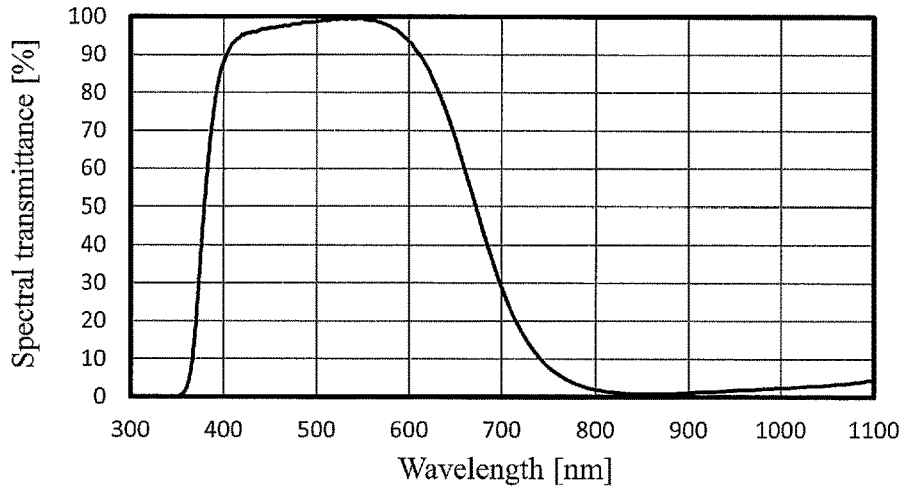
FIG. 17 is a transmittance spectrum of an infrared-cut filter according to Example 12.
Figure 18:
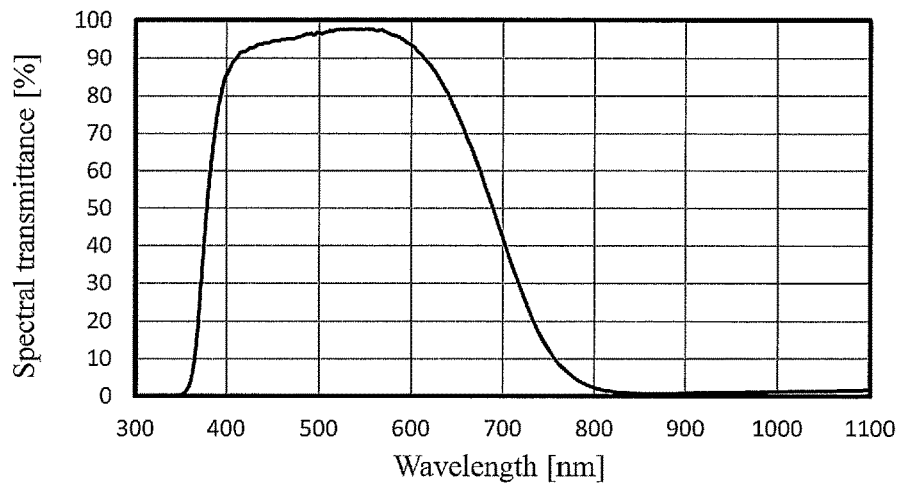
FIG. 18 is a transmittance spectrum of an infrared-cut filter according to Example 13.
Figure 19:
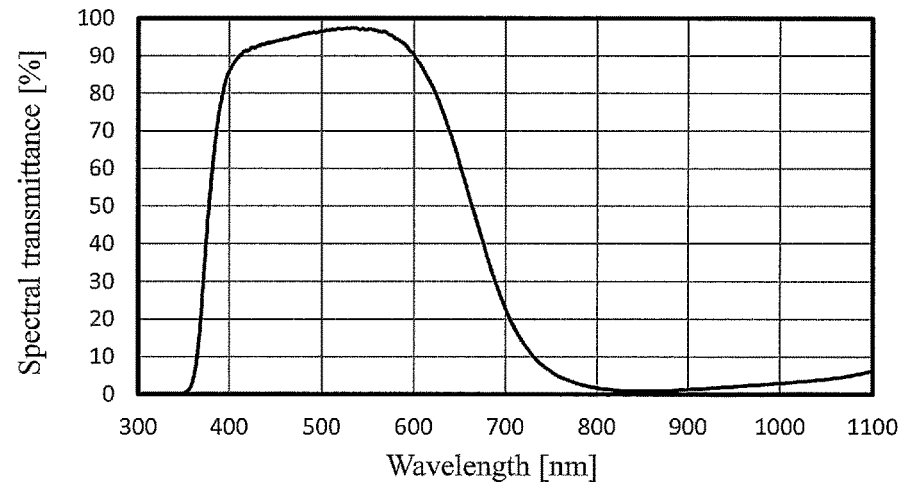
FIG. 19 is a transmittance spectrum of an infrared-cut filter according to Example 14.
Figure 20:
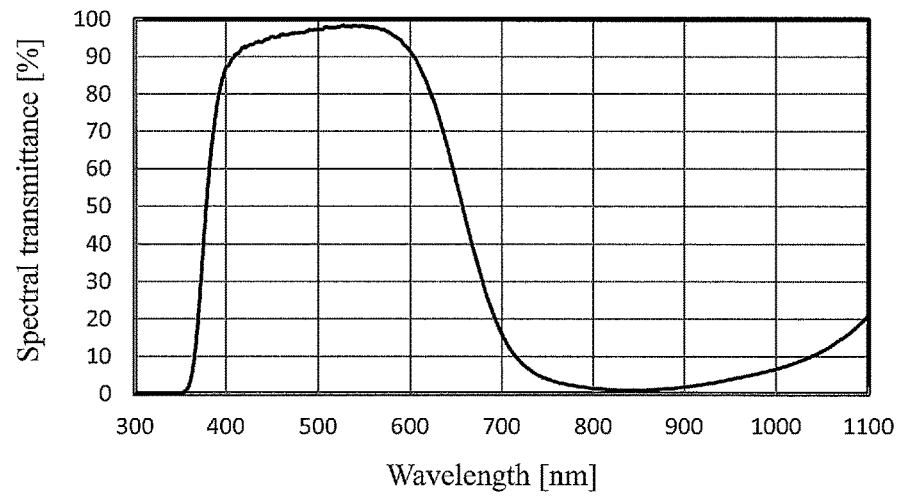
FIG. 20 is a transmittance spectrum of an infrared-cut filter according to Example 15.
Figure 21:
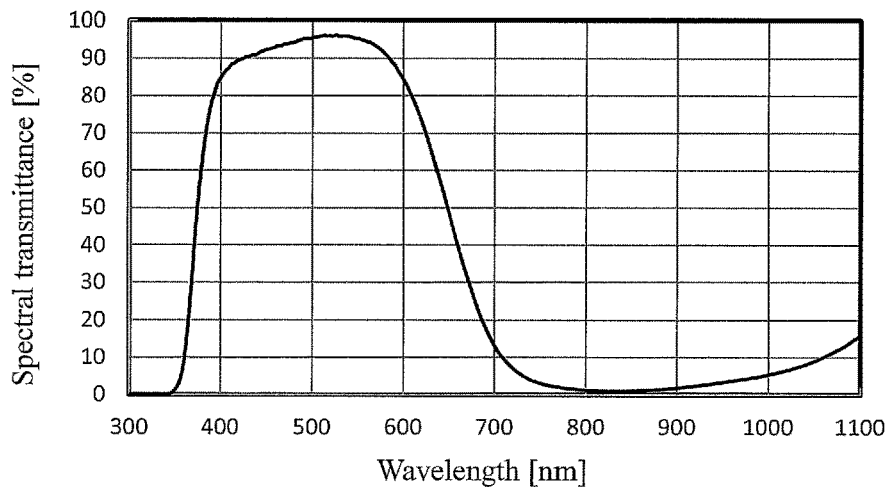
FIG. 21 is a transmittance spectrum of an infrared-cut filter according to Example 16.
Figure 22:
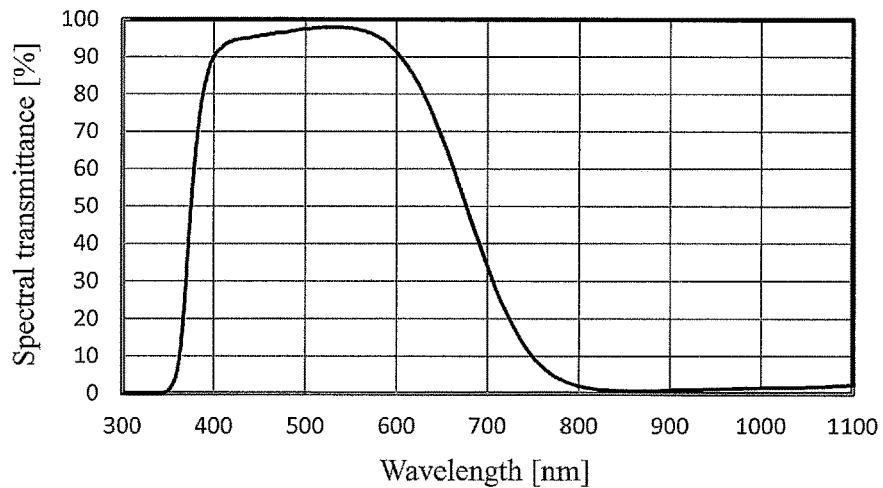
FIG. 22 is a transmittance spectrum of an infrared-cut filter according to Example 17.
Figure 23:
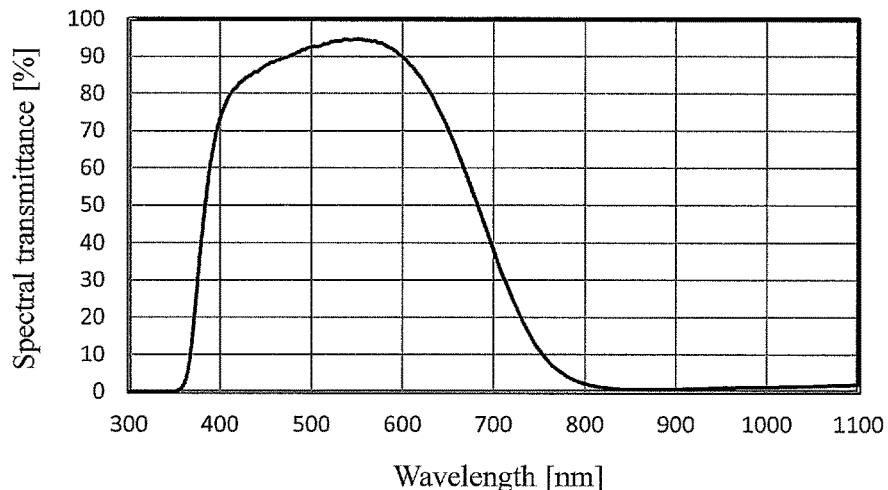
FIG. 23 is a transmittance spectrum of an infrared-cut filter according to Example 18.
Figure 24:
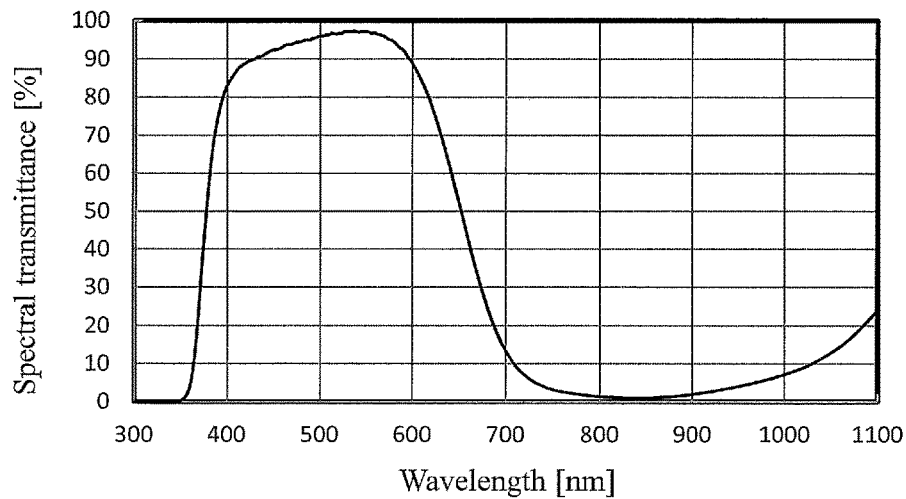
FIG. 24 is a transmittance spectrum of an infrared-cut filter according to Example 19.
Figure 25:
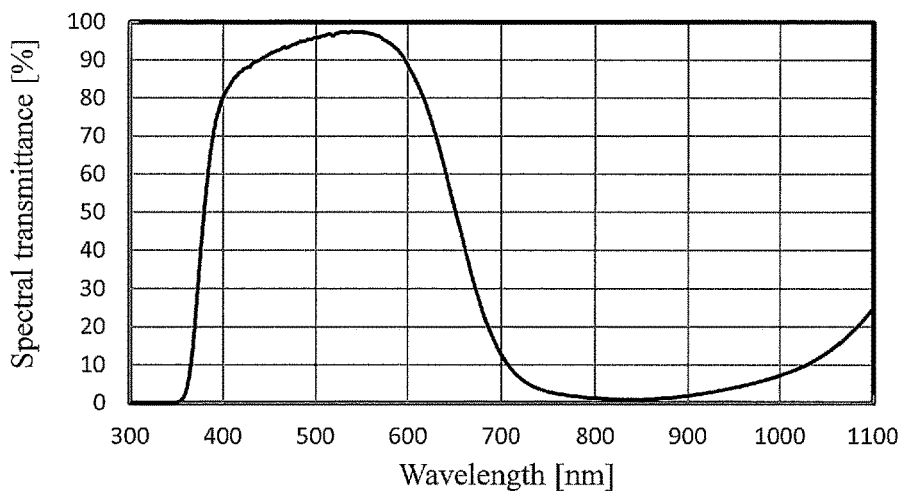
FIG. 25 is a transmittance spectrum of an infrared-cut filter according to Example 20.
Figure 26:
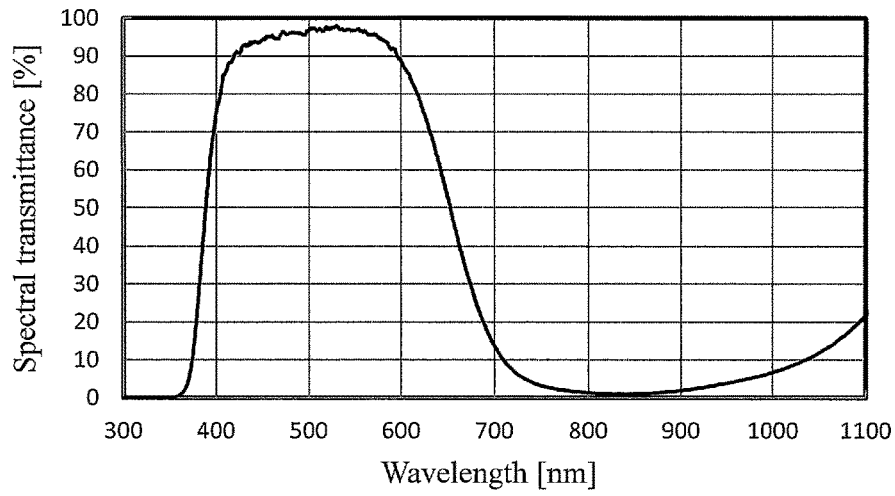
FIG. 26 is a transmittance spectrum of an infrared-cut filter according to Example 21.

A transparent glass substrate (manufactured by SCHOTT AG under the product name "D263") made of borosilicate glass and having a size of 76 mm×76 mm×0.21 mm was prepared, and about 0.3 g of the infrared-absorbing composition according to Example 1 was applied with a dispenser to a 30 mm×30 mm area in the central portion of one principal surface of the substrate to form a film. Next, the transparent glass substrate with the film undried was placed in an oven, and the film was heat-treated at 85° C. for 3 hours, then at 125° C. for 3 hours, then at 150° C. for 1 hour, and then at 170° C. for 3 hours. The film was thus hardened to produce an infrared-cut filter according to Example 1. FIG. 6 shows the transmittance spectrum of the infrared-cut filter according to Example 1. The ultraviolet-side cut-off wavelength, the infrared-side cut-off wavelength, and the light transmittance at wavelengths of 400 nm, 600 nm, and 700 nm of the infrared-cut filter according to Example 1 were determined from the transmittance spectrum, and the results are shown in Table 1.

Examples 2 to 21

Figure 27:
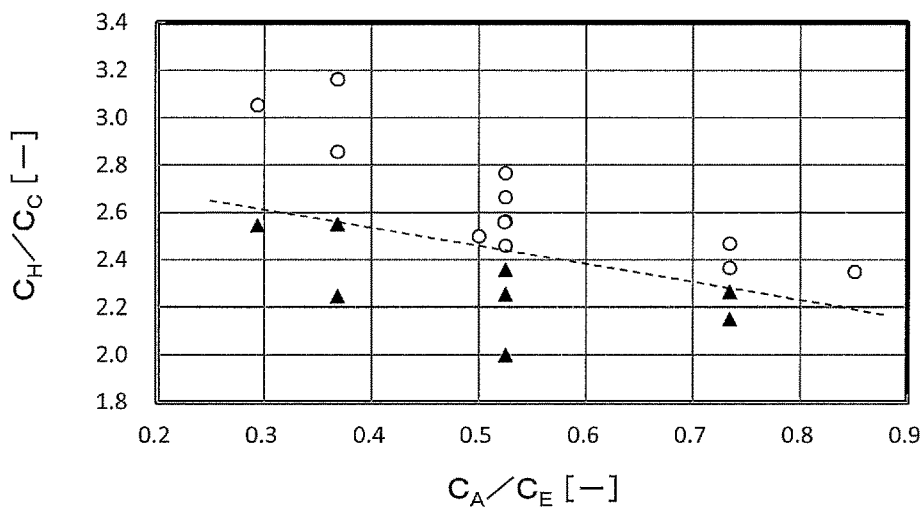
FIG. 27 is a graph showing, for infrared-absorbing compositions according to Examples 1 to 21, the relation between the ratio of the reactive hydroxy group content $C_H$ to the copper ion content $C_C$ ($C_H/C_C$) and the ratio of the phosphonic acid content $C_A$ to the phosphoric acid ester content $C_E$ ($C_A/C_E$).
Figure 28:
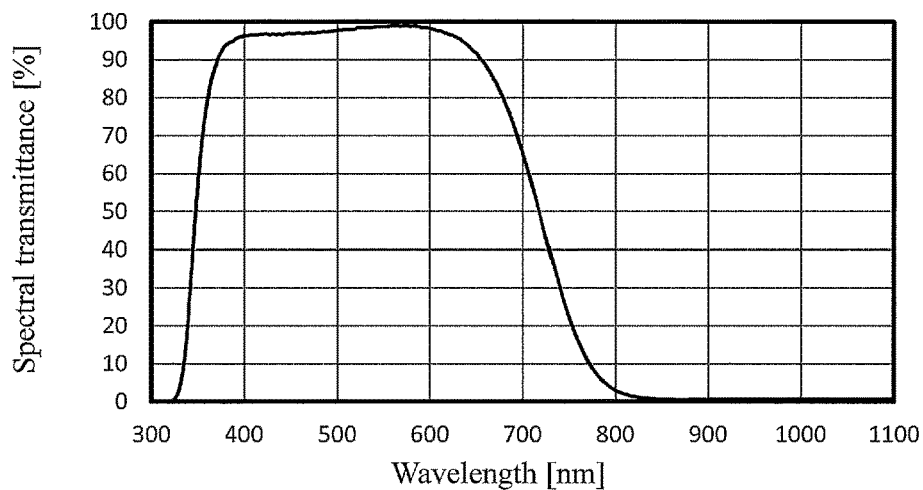
FIG. 28 is a transmittance spectrum of an infrared-cut filter according to Comparative Example 1.
Figure 29:
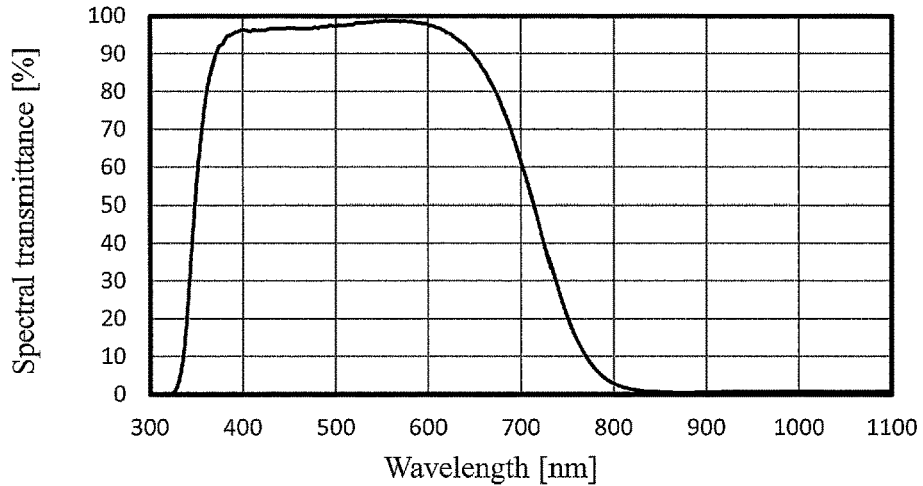
FIG. 29 is a transmittance spectrum of an infrared-cut filter according to Comparative Example 2.
Figure 30:
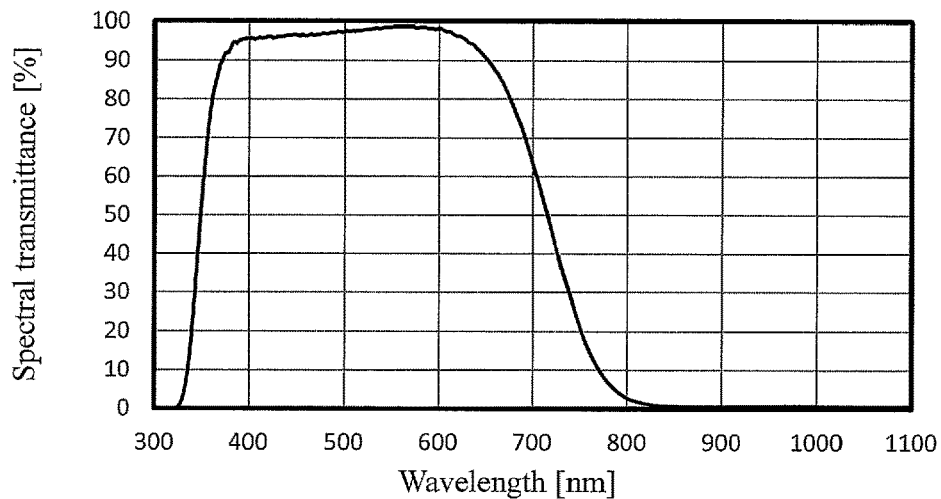
FIG. 30 is a transmittance spectrum of an infrared-cut filter according to Comparative Example 3.
Figure 31:
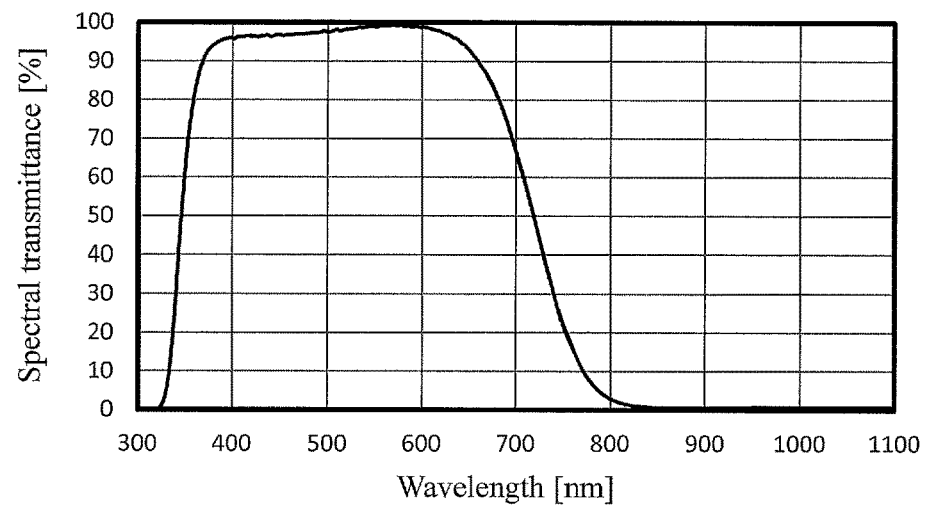
FIG. 31 is a transmittance spectrum of an infrared-cut filter according to Comparative Example 4.
Figure 32:
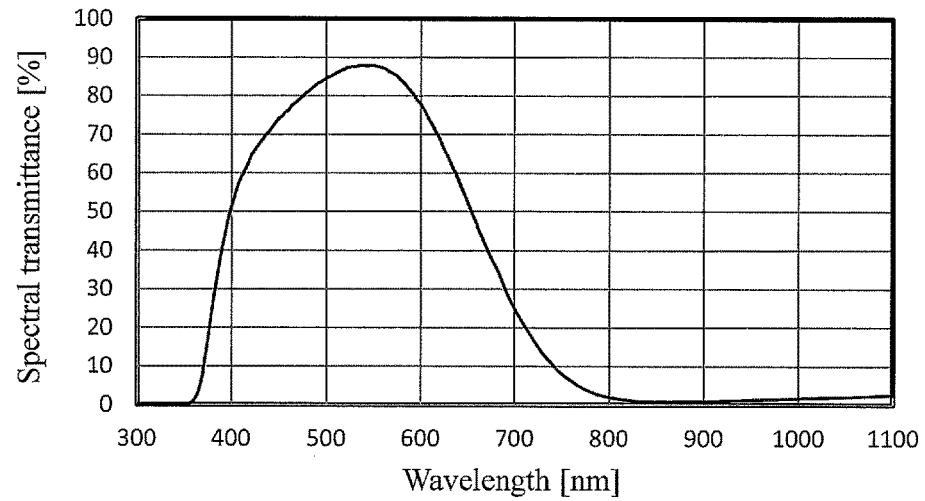
FIG. 32 is a transmittance spectrum of an infrared-cut filter according to Comparative Example 5.
Figure 33:
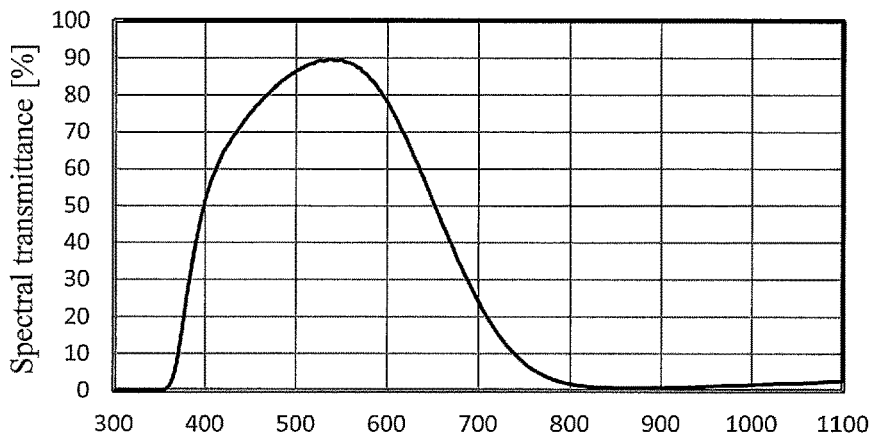
FIG. 33 is a transmittance spectrum of an infrared-cut filter according to Comparative Example 6.

Infrared-absorbing compositions according to Examples 2 to 18 were prepared in the same manner as in Example 1, except for changing the amounts of the phenylphosphonic acid and phosphoric acid ester compound as shown in Table 1. Infrared-absorbing compositions according to Example 19 and Example 20 were also prepared in the same manner as in Example 1, except for changing the amount of the phenylphosphonic acid to 0.584 g (3.691 mmol) and using 3.615 g (7.030 mmol) of NIKKOL DDP-2 (manufactured by Nikko Chemicals Co., Ltd.) or 5.475 g (7.033 mmol) of NIKKOL DDP-6 (manufactured by Nikko Chemicals Co., Ltd.) instead of 2.338 g (7.035 mmol) of PLYSURF A208F. NIKKOL DDP-2 is a phosphoric acid ester compound including phosphoric acid esters represented by the formulae (b1) and (b2) wherein $R_{21}$, $R_{22}$, and $R_3$ are the same and represented by $(CH_2CH_2O)_mR_5$ wherein m is 2 and $R_5$ is a monovalent group with 12 to 15 carbon atoms. The molecular weight of NIKKOL DDP-2 was calculated by assuming that the number of carbon atoms in $R_5$ is 13.5 corresponding to an average of the values from 12 to 15 and that NIKKOL DDP-2 includes the phosphoric acid diester represented by the formula (b1) and the phosphoric acid monoester represented by the formula (b2) in a molar ratio of 1:1. NIKKOL DDP-6 is a phosphoric acid ester compound including phosphoric acid esters represented by the formulae (b1) and (b2) wherein $R_{21}$, $R_{22}$, and $R_3$ are the same and represented by $(CH_2CH_2O)_m R_5$ wherein m is 6 and $R_5$ is a monovalent group with 12 to 15 carbon atoms. The molecular weight of NIKKOL DDP-6 was calculated, as in the case of NIKKOL DDP-2, by assuming that the number of carbon atoms in $R_5$ is 13.5 and that NIKKOL DDP-6 includes the phosphoric acid diester represented by the formula (b1) and the phosphoric acid monoester represented by the formula (b2) in a molar ratio of 1:1. An infrared-absorbing composition according to Example 21 was prepared in the same manner as in Example 1, except for using 0.835 g (3.523 mmol) of 4-bromophenylphosphonic acid (manufactured by Tokyo Chemical Industry Co., Ltd.) instead of 0.585 g (3.699 mmol) of phenylphosphonic acid (manufactured by Nissan Chemical Industries, Ltd.). Infrared-cut filters according to Examples 2 to 21 were produced in the same manner as in Example 1, except for using the infrared-absorbing compositions according to Examples 2 to 21 instead of the infrared-absorbing composition according to Example 1. FIGS. 7 to 26 show the transmittance spectra of the infrared-cut filters according to Examples 2 to 21, respectively. Table 1 shows the ultraviolet-side cut-off wavelength, the infrared-side cut-off wavelength, and the light transmittance at wavelengths of 400 nm, 600 nm, and 700 nm of the infrared-cut filters according to Examples 2 to 21. FIG. 27 shows the relation between the ratio of the reactive hydroxy group content $C_H$ mol to the copper ion content $C_C$ mol ($C_H/C_C$) and the ratio of the phosphonic acid content $C_A$ mol to the phosphoric acid ester content $C_E$ mol ($C_A/C_E$) for the infrared-absorbing compositions according to Examples 1 to 21. In FIG. 27, circles indicate values for Examples 1 to 8, 15, 16, and 19 to 21, while triangles indicate values for Examples 9 to 14, 17, and 18. The dashed line in FIG. 27 is a straight line represented by $C_H/C_C = 2.842 - 0.765 \times (C_A/C_E)$.

Comparative Examples 1 to 9

Infrared-absorbing compositions according to Comparative Examples 1 to 4 were prepared in the same manner as in Example 1, except for adding butylphosphonic acid, hexylphosphonic acid, or ethylphosphonic acid in an amount shown in Table 2 instead of phenylphosphonic acid and changing the amount of the phosphoric acid ester compound as shown in Table 2. Infrared-absorbing compositions according to Comparative Examples 5 to 8 were prepared in the same manner as in Example 1, except for changing the amounts of the phenylphosphonic acid and phosphoric acid ester compound as shown in Table 2. An infrared-absorbing composition according to Comparative Example 9 was prepared in the same manner as in Example 21, except for changing the amounts of the 4-bromophenylphosphonic acid and phosphoric acid ester compound as shown in Table 2. Infrared-cut filters according to Comparative Examples 1 to 6 were produced in the same manner as in Example 1, except for using the infrared-absorbing compositions according to Comparative Examples 1 to 6 instead of the infrared-absorbing composition according to Example 1. FIGS. 28 to 33 show the transmittance spectra of the infrared-cut filters according to Comparative Examples 1 to 6, respectively. Table 2 shows the ultraviolet-side cut-off wavelength, the infrared-side cut-off wavelength, and the light transmittance at wavelengths of 400 nm, 600 nm, and 700 nm of the infrared-cut filters according to Comparative Examples 1 to 6. In the infrared-absorbing compositions according to Comparative Examples 7 to 9, aggregates were significantly formed; namely, compositions in which fine particles are successfully dispersed were not obtained.

Examples 22 and 23

Figure 34:
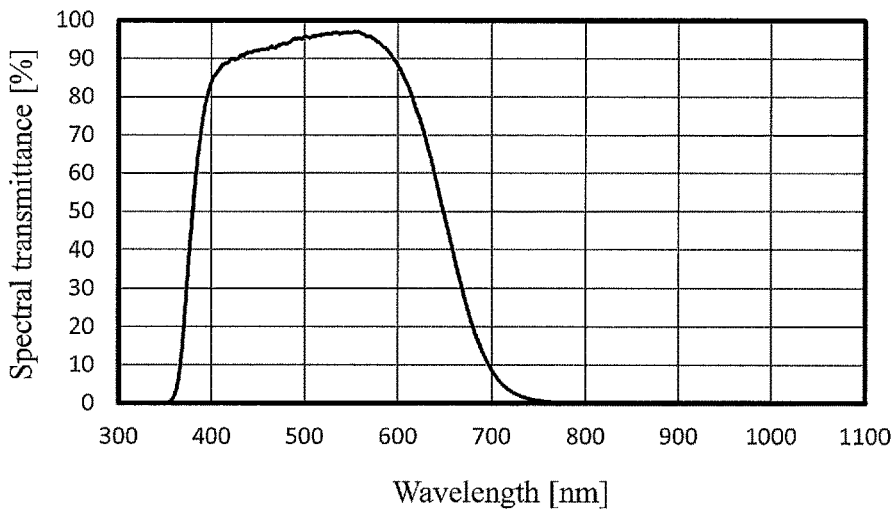
FIG. 34 is a transmittance spectrum of an infrared-cut filter according to Example 22.
Figure 35:
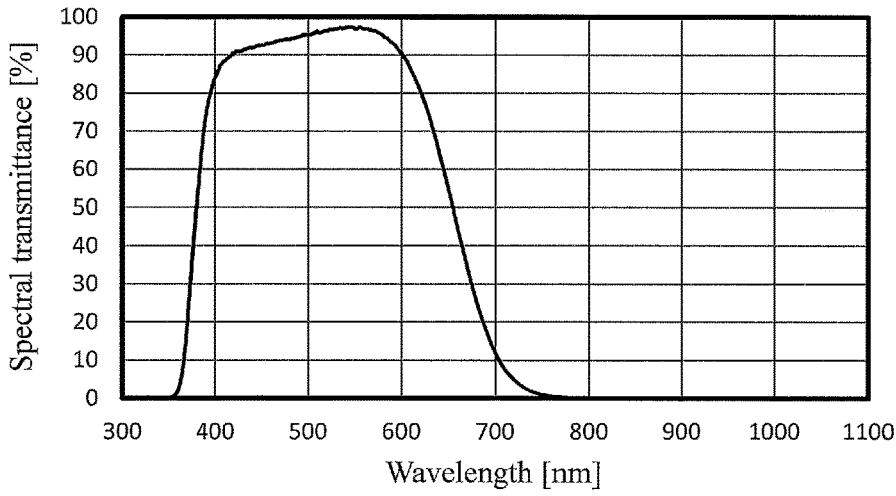
FIG. 35 is a transmittance spectrum of an infrared-cut filter according to Example 23.

The infrared-absorbing composition according to Example 12 was used to form a film on the other principal surface of the transparent glass substrate of the infrared-cut filter of Example 1 in the same manner as in Example 1, and the film was hardened by heat-treatment under the same conditions as in Example 1. An infrared-cut filter according to Example 22 was thus obtained. The infrared-absorbing composition according to Comparative Example 4 was used to form a film on the other principal surface of the transparent glass substrate of the infrared-cut filter of Example 5 in the same manner as in Example 1, and the film was hardened by heat-treatment under the same conditions as in Example 1. An infrared-cut filter according to Example 23 was thus obtained. FIGS. 34 and 35 show the transmittance spectra of the infrared-cut filters according to Examples 22 and 23, respectively. Table 1 shows the ultraviolet-side cut-off wavelength, the infrared-side cut-off wavelength, and the light transmittance at wavelengths of 400 nm, 600 nm, and 700 nm of the infrared-cut filters according to Examples 22 and 23.

As seen from FIGS. 6 to 26, 34, and 35, the infrared-cut filters according to Examples 1 to 23 showed a transmittance as high as 70% or more at a particular range of wavelengths in the visible region (wavelengths of 400 nm to 600 nm). As shown in Table 1, the infrared-side cut-off wavelength of the infrared-cut filters according to Examples 1 to 23 was 700 nm or less, and the ultraviolet-side cut-off wavelength of the infrared-cut filters according to Examples 1 to 23 was 375 to 389 nm. This suggested that the infrared-cut filters according to Examples 1 to 23 have desired optical properties as an infrared-cut filter to be disposed ahead of an imaging sensor in an imaging optical system of an imaging apparatus such as a digital camera. By contrast, as shown in Table 2, the infrared-side cut-off wavelength of the infrared-cut filters according to Comparative Examples 1 to 4 was more than 700 nm, and the ultraviolet-side cut-off wavelength of the infrared-cut filters according to Comparative Examples 1 to 4 was less than 350 nm. As seen from FIGS. 32 and 33, the infrared-cut filters according to Comparative Examples 5 and 6 showed a transmittance as low as about 50% at a wavelength of 400 nm. The infrared-cut filters according to Comparative Examples 1 to 6 can therefore not be considered to have had desired optical properties as an infrared-cut filter to be disposed ahead of an imaging sensor in an imaging optical system of an imaging apparatus such as a digital camera.

As shown in Table 1, the infrared-side cut-off wavelength of the infrared-cut filters according to Examples 1 to 8, 15, 16, and 19 to 21 was 660 nm or less, which suggested that the infrared-cut filters according to these examples have more desired optical properties. The infrared-side cut-off wavelength of the infrared-cut filters according to Examples 9 to 14, 17, and 18 was less than 700 nm but more than 660 nm. This, combined with FIG. 27, suggested that the infrared-side cut-off wavelength of an infrared-cut filter is more likely to be reduced to 660 nm or less when the relation $C_H/C_C \geq 2.842 - 0.765 \times (C_A/C_E)$ is satisfied.

As seen from FIGS. 34 and 35, the light transmittance of the infrared-cut filters according to Examples 22 and 23 in the wavelength range of 900 nm to 1100 nm was less than 3%. This suggested that the infrared-cut filters according to Examples 22 and 23 have more desired optical properties as an infrared-cut filter.

TABLE 1

| Example | Type of phosphonic acid | Contents of components [mmol] | | | Ratio between contents of components | |
|---|---|---|---|---|---|---|
| | | Phosphonic acid | Phosphoric acid ester | Copper acetate hydrate | Reactive hydroxy group/copper ion ($C_H/C_C$) | Phosphonic acid/phosphoric acid ester ($C_A/C_E$) |
| 1 | Phenylphosphonic acid | 3.699 | 7.035 | 5.635 | 2.561 | 0.526 |
| 2 | Phenylphosphonic acid | 3.551 | 6.753 | 5.635 | 2.459 | 0.526 |
| 3 | Phenylphosphonic acid | 3.847 | 7.314 | 5.635 | 2.663 | 0.526 |
| 4 | Phenylphosphonic acid | 3.994 | 7.595 | 5.635 | 2.765 | 0.526 |
| 5 | Phenylphosphonic acid | 3.966 | 5.394 | 5.635 | 2.365 | 0.735 |
| 6 | Phenylphosphonic acid | 4.140 | 5.627 | 5.635 | 2.468 | 0.736 |
| 7 | Phenylphosphonic acid | 3.411 | 9.266 | 5.635 | 2.855 | 0.368 |
| 8 | Phenylphosphonic acid | 3.777 | 10.259 | 5.635 | 3.161 | 0.368 |
| 9 | Phenylphosphonic acid | 3.606 | 4.904 | 5.635 | 2.150 | 0.735 |
| 10 | Phenylphosphonic acid | 3.795 | 5.161 | 5.635 | 2.263 | 0.735 |
| 11 | Phenylphosphonic acid | 3.251 | 6.188 | 5.635 | 2.252 | 0.525 |
| 12 | Phenylphosphonic acid | 3.403 | 6.471 | 5.635 | 2.356 | 0.526 |
| 13 | Phenylphosphonic acid | 2.680 | 7.281 | 5.635 | 2.243 | 0.368 |
| 14 | Phenylphosphonic acid | 3.046 | 8.273 | 5.635 | 2.549 | 0.368 |
| 15 | Phenylphosphonic acid | 4.169 | 4.896 | 5.635 | 2.348 | 0.851 |
| 16 | Phenylphosphonic acid | 3.184 | 10.829 | 5.635 | 3.052 | 0.294 |
| 17 | Phenylphosphonic acid | 2.654 | 9.024 | 5.635 | 2.543 | 0.294 |
| 18 | Phenylphosphonic acid | 2.887 | 5.490 | 5.635 | 1.999 | 0.526 |
| 19 | Phenylphosphonic acid | 3.691 | 7.030 | 5.635 | 2.558 | 0.525 |
| 20 | Phenylphosphonic acid | 3.691 | 7.033 | 5.635 | 2.558 | 0.525 |
| 21 | 4-Bromophenylphosphonic acid | 3.523 | 7.032 | 5.635 | 2.499 | 0.501 |
| 22 | Same as in Examples 1 and 12 | | | | | |
| 23 | Same as in Example 5 and Comparative Example 4 | | | | | |

| Example | Ultraviolet-side cut-off wavelength [nm] | Infrared-side cut-off wavelength [nm] | Transmittance [%] | | |
|---|---|---|---|---|---|
| | | | 400 nm | 600 nm | 700 nm |
| 1 | 378 | 654 | 87.7 | 90.1 | 13.7 |
| 2 | 378 | 659 | 87.5 | 90.6 | 18.8 |
| 3 | 378 | 654 | 87.1 | 90.4 | 13.7 |
| 4 | 379 | 654 | 85.9 | 90.3 | 13.9 |
| 5 | 378 | 660 | 87.6 | 91.6 | 18.1 |
| 6 | 380 | 659 | 85.1 | 92.9 | 16.7 |
| 7 | 377 | 652 | 85.4 | 87.5 | 13.5 |
| 8 | 378 | 650 | 82.9 | 87.0 | 14.2 |
| 9 | 382 | 685 | 83.9 | 94.2 | 39.1 |
| 10 | 380 | 674 | 86.4 | 93.9 | 29.9 |
| 11 | 380 | 681 | 85.7 | 93.0 | 36.4 |
| 12 | 379 | 672 | 88.1 | 93.5 | 28.9 |
| 13 | 378 | 689 | 85.8 | 93.5 | 42.1 |
| 14 | 378 | 663 | 85.9 | 90.4 | 23.0 |
| 15 | 379 | 657 | 86.9 | 91.5 | 16.1 |
| 16 | 375 | 648 | 84.9 | 84.4 | 13.3 |
| 17 | 375 | 677 | 90.1 | 91.3 | 33.9 |
| 18 | 384 | 683 | 73.4 | 89.9 | 38.3 |
| 19 | 378 | 652 | 83.2 | 89.1 | 13.5 |
| 20 | 379 | 651 | 80.5 | 88.7 | 12.8 |
| 21 | 389 | 653 | 75.2 | 89.1 | 13.8 |
| 22 | 380 | 649 | 83.9 | 88.3 | 8.7 |
| 23 | 379 | 655 | 84.1 | 90.6 | 12.1 |

TABLE 2

| Comparative Example | Type of phosphonic acid | Contents of components [mmol] | | | Ratio between contents of components | |
|---|---|---|---|---|---|---|
| | | Phosphonic acid | phosphoric acid ester | Copper acetate hydrate | Reactive hydroxy group/copper ion ($C_H/C_C$) | Phosphonic acid/phosphoric acid ester ($C_A/C_E$) |
| 1 | Butylphosphonic acid | 4.852 | 2.681 | 5.635 | 2.198 | 1.810 |
| 2 | Hexylphosphonic acid | 4.378 | 3.643 | 5.635 | 2.201 | 1.202 |

TABLE 2-continued

| | | | | | | |
|---|---|---|---|---|---|---|
| 3 | Hexylphosphonic acid | 4.969 | 4.135 | 5.635 | 2.498 | 1.202 |
| 4 | Ethylphosphonic acid | 4.372 | 3.642 | 5.635 | 2.198 | 1.200 |
| 5 | Phenylphosphonic acid | 2.741 | 5.219 | 5.635 | 1.899 | 0.525 |
| 6 | Phenylphosphonic acid | 2.526 | 4.805 | 5.635 | 1.749 | 0.526 |
| 7 | Phenylphosphonic acid | 4.931 | 4.690 | 5.635 | 2.582 | 1.051 |
| 8 | Phenylphosphonic acid | 3.905 | 3.715 | 5.635 | 2.045 | 1.051 |
| 9 | 4-Bromophenylphosphonic acid | 4.772 | 4.538 | 5.635 | 2.499 | 1.052 |

| Comparative Example | Ultraviolet-side cut-off wavelength [nm] | Infrared-side cut-off wavelength [nm] | Transmittance [%] | | |
|---|---|---|---|---|---|
| | | | 400 nm | 600 nm | 700 nm |
| 1 | 348 | 718 | 96.3 | 98.2 | 65.6 |
| 2 | 349 | 714 | 96.3 | 97.6 | 61.5 |
| 3 | 349 | 716 | 95.7 | 98.1 | 63.5 |
| 4 | 346 | 719 | 96.0 | 98.9 | 67.0 |
| 5 | 398 | 654 | 51.3 | 77.9 | 25.1 |
| 6 | 399 | 653 | 51.5 | 78.2 | 24.1 |
| 7 | — | | | | |
| 8 | — | | | | |
| 9 | — | | | | |

The invention claimed is:

1. An infrared-absorbing composition comprising:

an infrared absorber formed by a phosphonic acid represented by the following formula (a) and copper ion:

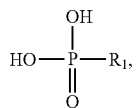

(a)

wherein $R_1$ is a phenyl group or a phenyl group in which at least one hydrogen atom is substituted by a halogen atom; and a phosphoric acid ester comprising at least one of a phosphoric acid diester and a phosphoric acid monoester and allowing the infrared absorber to be dispersed, wherein molar contents of the phosphonic acid, the copper ion, and the phosphoric acid ester are respectively defined as $C_A$ mol, $C_C$ mol, and $C_E$ mol, a total molar content of reactive hydroxy groups including two hydroxy groups contained in one molecule of the phosphonic acid, one hydroxy group contained in one molecule of the phosphoric acid diester, and one hydroxy group contained in one molecule of the phosphoric acid monoester is defined as $C_H$ mol, and the relations $C_A/C_E < 1$, $1.95 < C_H/C_C \leq 2.5$, and $C_H/C_C \geq 2.842 - 0.765 \times C_A/C_E$ are satisfied.

2. The infrared-absorbing composition according to claim 1, wherein the phosphoric acid diester is represented by the following formula (b1) and the phosphoric acid monoester is represented by the following formula (b2):

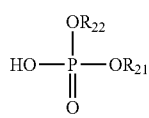

(b1)

-continued $$\begin{array}{c} OH \\ | \\ HO-P-OR_3 \\ \| \\ O \end{array}$$ (b2)

wherein: $R_{21}$, $R_{22}$, and $R_3$ are each a monovalent functional group represented by $-(CH_2CH_2O)_nR_4$ wherein n is an integer of 1 to 25 and $R_4$ is an alkyl group with 6 to 25 carbon atoms; and $R_{21}$, $R_{22}$, and $R_3$ are the same or different functional groups.

3. The infrared-absorbing composition according to claim 1, wherein the relation $0.20 \leq C_A/C_E \leq 0.85$ is satisfied.

4. The infrared-absorbing composition according to claim 1, further comprising a matrix component.

5. The infrared-absorbing composition according to claim 4, wherein the matrix component is a polysiloxane.

6. An infrared-cut filter comprising:

a transparent dielectric substrate; and an infrared-absorbing layer provided on at least one principal surface of the transparent dielectric substrate and formed by the infrared-absorbing composition according to claim 1.

7. An imaging optical system comprising the infrared-cut filter according to claim 6.

8. The infrared-cut filter according to claim 6, wherein the infrared-cut filter has a light transmittance of 70% or more in a wavelength range of 400 nm to 600 nm, and the infrared-cut filter has a thickness of 40 μm to 900 μm.

9. The infrared-cut filter according to claim 6, wherein the infrared-cut filter has a light transmittance of 75% or more in a wavelength range of 400 nm to 600 nm, and the infrared-cut filter has a thickness of 40 μm to 900 μm.

10. The infrared-cut filter according to claim 6, wherein the infrared-cut filter has an infrared-side cut-off wavelength of 660 nm or less, the infrared-cut filter has a light transmittance of 50% at the infrared-side cut-off wavelength, and the infrared-cut filter has a thickness of 40 μm to 900 μm.

11. The infrared-cut filter according to claim 6, wherein the infrared-cut filter has an ultraviolet-side cut-off wavelength of 370 nm or more,
  the infrared-cut filter has a light transmittance of 50% at the ultraviolet-side cut-off wavelength, and
  the infrared-cut filter has a thickness of 40 μm to 900 μm.

* * * * *